US007770753B2

(12) United States Patent
Blankenau

(10) Patent No.: US 7,770,753 B2
(45) Date of Patent: Aug. 10, 2010

(54) SINGLE VEND NEWSPAPER VENDING MACHINE

(76) Inventor: Gerald Blankenau, 15861 Larimore Plz., #92, Omaha, NE (US) 68116

( * ) Notice: Subject to any disclaimer, the term of this patent is extended or adjusted under 35 U.S.C. 154(b) by 85 days.

(21) Appl. No.: 11/804,563

(22) Filed: May 18, 2007

(65) Prior Publication Data

US 2007/0289989 A1 Dec. 20, 2007

Related U.S. Application Data

(60) Provisional application No. 60/801,745, filed on May 19, 2006.

(51) Int. Cl.
*G07F 11/00* (2006.01)
*B65G 59/00* (2006.01)

(52) U.S. Cl. ...................... 221/195; 221/194; 221/259; 221/43

(58) Field of Classification Search ......... 221/1–312 C, 221/194–195, 175, 176, 189, 259, 42, 43, 221/261
See application file for complete search history.

(56) References Cited

U.S. PATENT DOCUMENTS 3,250,432 A * 5/1966 Green et al. ................ 221/289
3,912,124 A * 10/1975 Pinkerton ................... 221/298
4,389,000 A * 6/1983 Godley et al. .................. 221/8
4,940,160 A * 7/1990 Williams ..................... 221/34
5,000,346 A * 3/1991 Moore et al. ................ 221/215
5,492,213 A * 2/1996 Kim ........................... 194/237
5,813,568 A * 9/1998 Lowing ......................... 221/6
6,003,725 A * 12/1999 Blankenau et al. .......... 221/195
6,279,684 B1 * 8/2001 Lewis .......................... 186/36
6,467,649 B1 * 10/2002 Ullman et al. .............. 221/192
7,077,288 B2 * 7/2006 McMillen ................... 221/194

* cited by examiner

*Primary Examiner*—Gene Crawford
*Assistant Examiner*—Michael K Collins
(74) *Attorney, Agent, or Firm*—Suiter Swantz pc llo

(57) ABSTRACT

In combination, a vending machine for newspapers which includes a storage area for newspapers, a dispensing device, and an output device through and from which the newspapers fall downwards and an output chute including a lower newspaper-receiving support slot having a rearwardly angled lower wall, an upper wall extending generally parallel with the lower wall and spaced thereabove, a base wall and side walls which together form the generally rectangular box shape of said lower newspaper-receiving support slot. The lower and upper walls extend at an angle between 10° and 40° from vertical, and the lower wall has a height of between one-half inch and three inches less then the height of the newspaper such that upon the newspaper being dropped therein, a graspable portion of the newspaper protrudes whereby the newspaper is easily removable from said lower newspaper-receiving support slot.

3 Claims, 19 Drawing Sheets

SINGLE VEND NEWSPAPER VENDING MACHINE

CROSS-REFERENCE TO RELATED PATENTS

This application claims priority based on a provisional patent, specifically on the Provisional Patent Application Ser. No. 60/801,745 filed May 19, 2006.

BACKGROUND OF THE INVENTION

1. Technical Field

The present invention relates to newspaper vending machines and, more particularly, to a single-vend, single-fold newspaper vending machine having a single vend newspaper vending mechanism which will dispense a single newspaper downwards into a chute which will receive the vended newspaper and permit the newspaper to fall forwards and have an upper portion extend partially out of the chute for easy access thereto by a purchaser of the newspaper.

2. Description of the Prior Art

Most newspaper vending machines on the market today are coin actuated and the insertion of a coin into the machine enables the prospective purchaser to open a door to gain access to the entire supply of newspapers within the machine. While the majority of customers will at that time only remove a single newspaper, there are some individuals who will remove multiple newspapers from the machine either for resale or distribution to others. Obviously, there is a need for a newspaper vending machine which will prevent the theft of newspapers from the machine.

Prior attempts have been made to overcome this problem by designing vending machines to dispense only a single copy of the newspaper in response to the insertion of coins in the machine. The scarcity of single copy newspaper vending machines is the best evidence of the failure of the prior art designs for single copy newspaper vending machines to address and solve the problems presented.

Various attempts have been made in the prior art to make single vend newspaper vending machines. For example, Moore, U.S. Pat. No. 4,139,120, discloses a newspaper vending machine which features an article holder which supports a newspaper stack. The reference also includes a pusher which frictionally or by piercing will engage each newspaper at the top of the stack and move it up and out of contact with the presser where upon the paper falls into a dispensing tray. The major disadvantage found in Moore, obviously, is that the intricate nature of the pulley system and movable nature of the pusher arrangement will almost certainly lead to numerous breakdowns and malfunctions while the invention is being used. Furthermore, there is no means by which the papers held within the machine can be seen to enable a potential purchaser to decide whether he or she should make that purchase.

Another example of a newspaper vending machine found in the prior art is shown in Godley, Sr., U.S. Pat. No. 4,312,461, which discloses a newspaper vending machine having a vertically moveable platform and a dispensing wedge. A drive shaft rotates to raise or lower the platform in response to rotation of an external crank thus vending the next newspaper on a stack. While Godley certainly presents a more simple and efficient system for vending newspapers than Moore, Godley includes several features which can be improved upon. For example, the dispensing mechanism for the newspaper involves the raising the stack of newspapers above a dispensing wedge thus allow the topmost newspaper to slide off of the top of the stack and thus be dispensed. However, some vended newspapers are of a narrow thickness and, therefore, as the platform is cranked upwards, the height added to the newspaper platform may cause two or more newspapers to fall from the top of the stack, thus resulting in the entire purpose for the invention being destroyed. Also, the crank handle as shown in Godley may be more prone to malfunctions due to the various connected elements within Godley. There is therefore a need for reliable and efficient single vend newspaper vending machine which will correctly vend even newspapers of narrow thickness.

Various other inventions have been proposed in the prior art which attempt to address and resolve the problems inherent in single vend newspaper vending machines. Included among these are such devices as Gunzler, U.S. Pat. No. 3,705,665, Wingate, U.S. Pat. Nos. 4,448,328, and 4,506,800, and Hennessy, U.S. Pat. No. 4,654,513. Each of these inventions, however, include inherent problems which do not fully address and solve the problem of producing an efficient and reliable single vend newspaper vending machine. There is therefore a need for an efficient and reliable single vend newspaper vending machine.

Another problem encountered in connection with coin operated vending machines in the prior art is that it is often possible for the machine to "jam" with a paper stuck in the dispensing chute. This can result in the person using the machine to be able to reach into the machine to remove additional papers illegally. There is a need for a dispensing mechanism and chute which will prevent such unauthorized access.

Therefore, an object of the present invention is to provide an improved single vend newspaper vending machine having an output slot for supporting the newspaper in an easily graspable position.

Another object of the present invention is to provide an improved single vend newspaper vending machine having an output slot which is capable of vending papers of varying thicknesses one at a time.

Another object of the present invention is to provide an improved single vend newspaper vending machine having an output slot which will prevent unauthorized entry into the interior of the machine through the dispensing slot or handle section.

Finally, an object of the present invention is to provide an improved single vend newspaper vending machine having an output slot which is safe, durable and efficient in use.

SUMMARY OF THE INVENTION

The present invention provides in combination a vending machine for printed publications such as magazines, periodicals or newspapers, the vending machine comprising a storage area for the printed publications, a dispensing means for selecting and dispensing one of the printed publications and output means for dropping the selected printed publication downwards through and out of the vending machine and an output chute. The output chute includes a lower newspaper-receiving support slot positioned below the output means of the vending machine to receive the printed publication. The lower newspaper-receiving support slot includes a rearwardly angled lower wall, a base wall extending inwards from the base of the lower wall, an upper wall extending generally parallel with, positioned above and spaced from the lower wall and side walls connecting and closing the left and right sides of the upper and lower walls thereby forming the generally rectangular box shape of the lower newspaper-receiving support slot. The lower and upper walls extend at an angle between 10° and 40° from vertical whereby the printed publication will be retained within the lower newspaper-receiving support slot once it has fallen therein and the lower wall of the lower newspaper-receiving support slot has a height such that upon the printed publication being dropped therein, a graspable portion of the printed publication will protrude from the lower newspaper-receiving support slot whereby the printed publication is easily removable from the lower newspaper-receiving support slot.

DESCRIPTION OF THE PREFERRED EMBODIMENT

Figure 1:
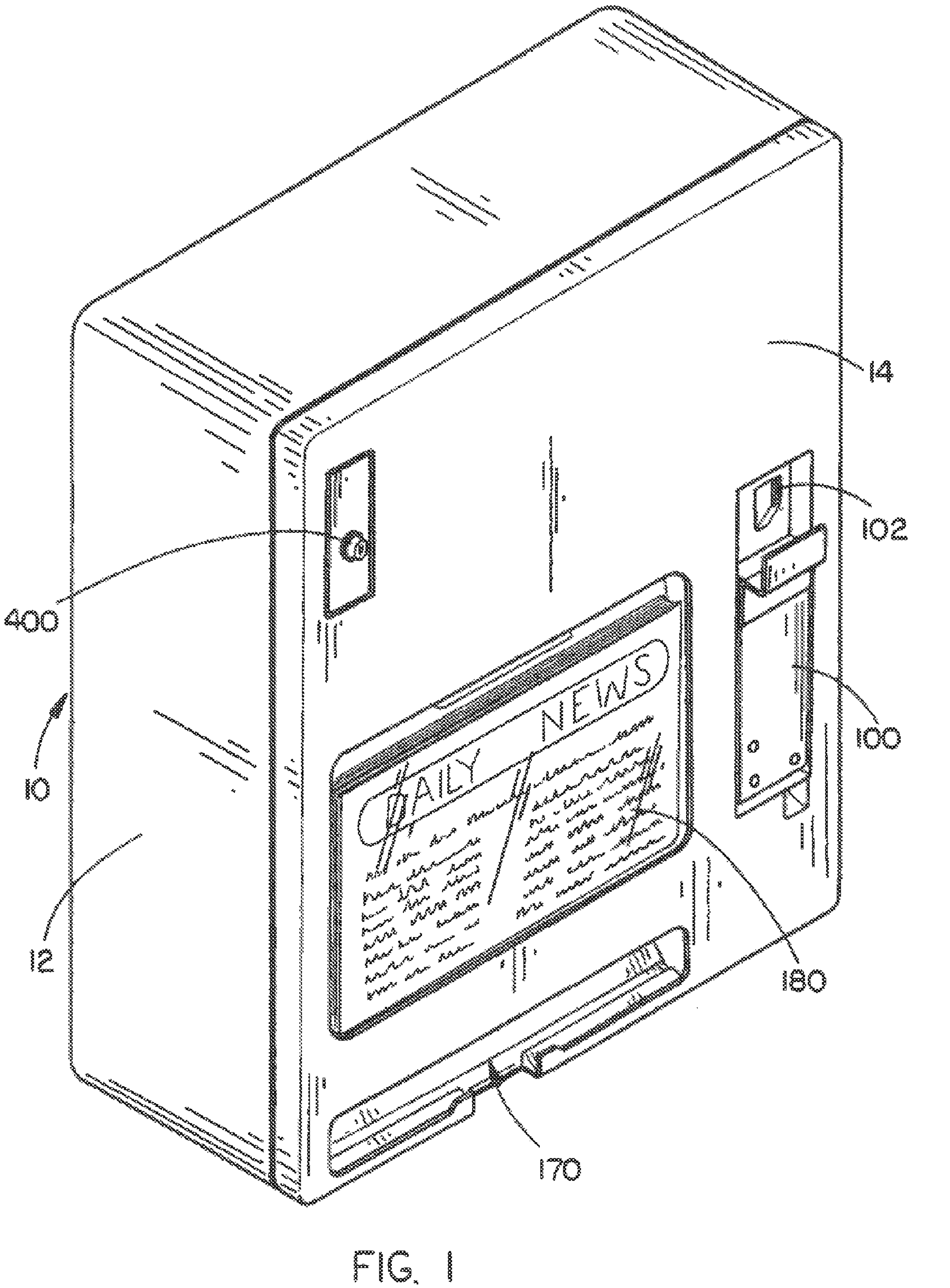
FIG. 1 is a perspective view of the single vend newspaper vending machine of the present invention.
Figure 2:
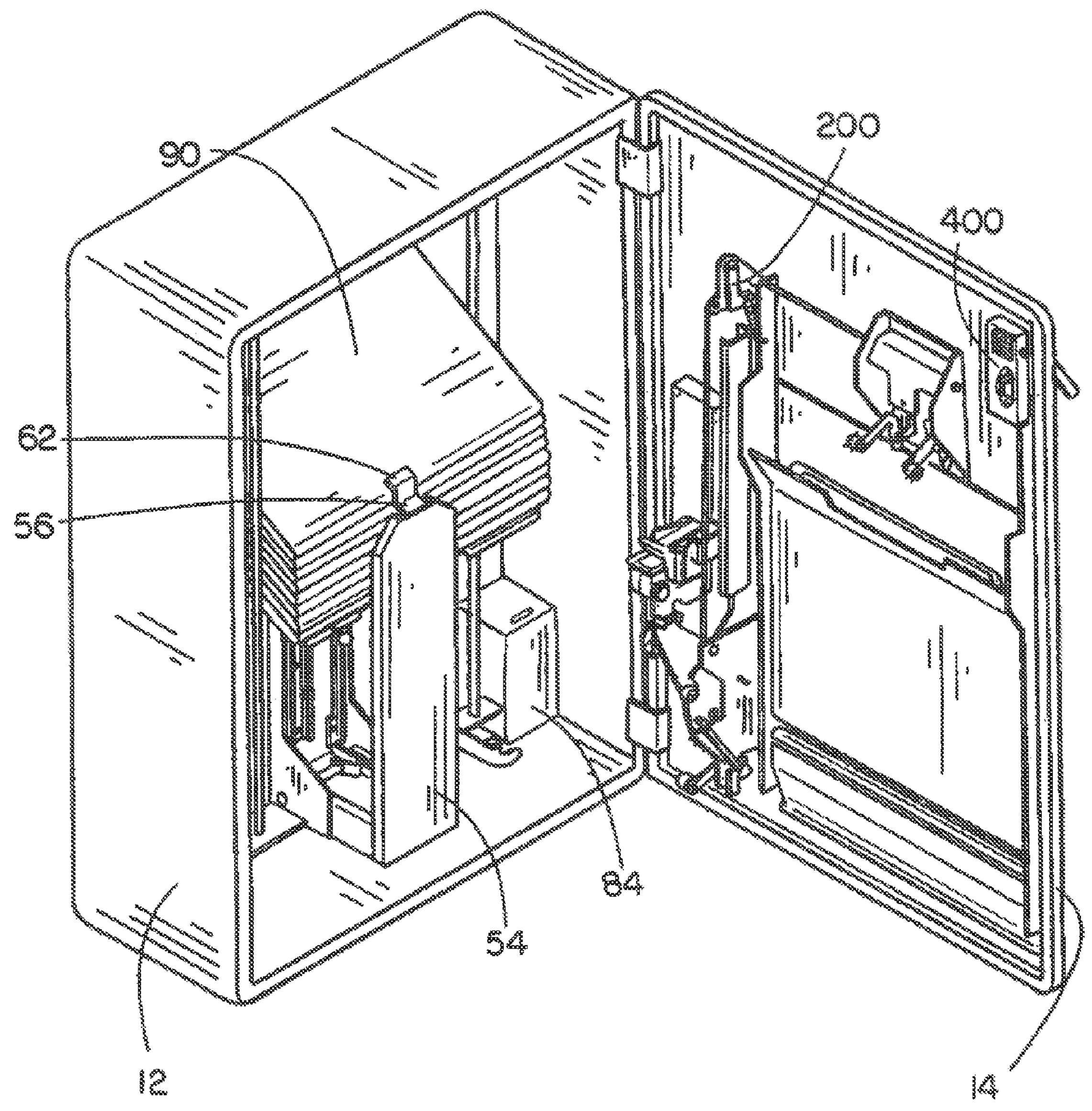
FIG. 2 is a perspective view of the present invention showing the internal features thereof.

The single vend newspaper vending machine 10 of the present invention is shown best in FIGS. 1-13 as including a generally rectangular box machine housing 12 including a hinge mounted front door 14 shown best in FIG. 2. It is preferred that machine housing 12 be constructed of a medium-thickness sheet metal formed in a manner commonly associated with formation of sheet metal boxes. The machine housing 12 is adapted to be mounted on a wall or the like by any appropriate wall mount device.

The internal components of the single vend newspaper vending machine 10 may be divided into two general categories, those features mounted within the machine housing 12 and those features mounted on the front door 14. Of course, it is to be understood that for many of these features described below the mounting on the door 14 or in the machine housing 12 is not critical provided that the elements are mounted in such a way as to insure proper functioning and interfunctioning of the various elements. The following description shall begin with the features mounted within the machine housing 12.

The machine housing features of the present invention are best shown in FIGS. 3-6 and include a generally vertical slide track 16 which extends upwards and is connected to base 18. It is preferred that slide track 16 be formed of sheet metal and include a pair of vertical channels 20*a* and 20*b*, best shown in FIGS. 2 and 4. To increase the connection strength between slide track 16 and base 18, a pair of reinforcement plates 22*a* and 22*b*, are preferably connected to slide track 16 and base 18 as shown in FIG. 2.

Figure 4:
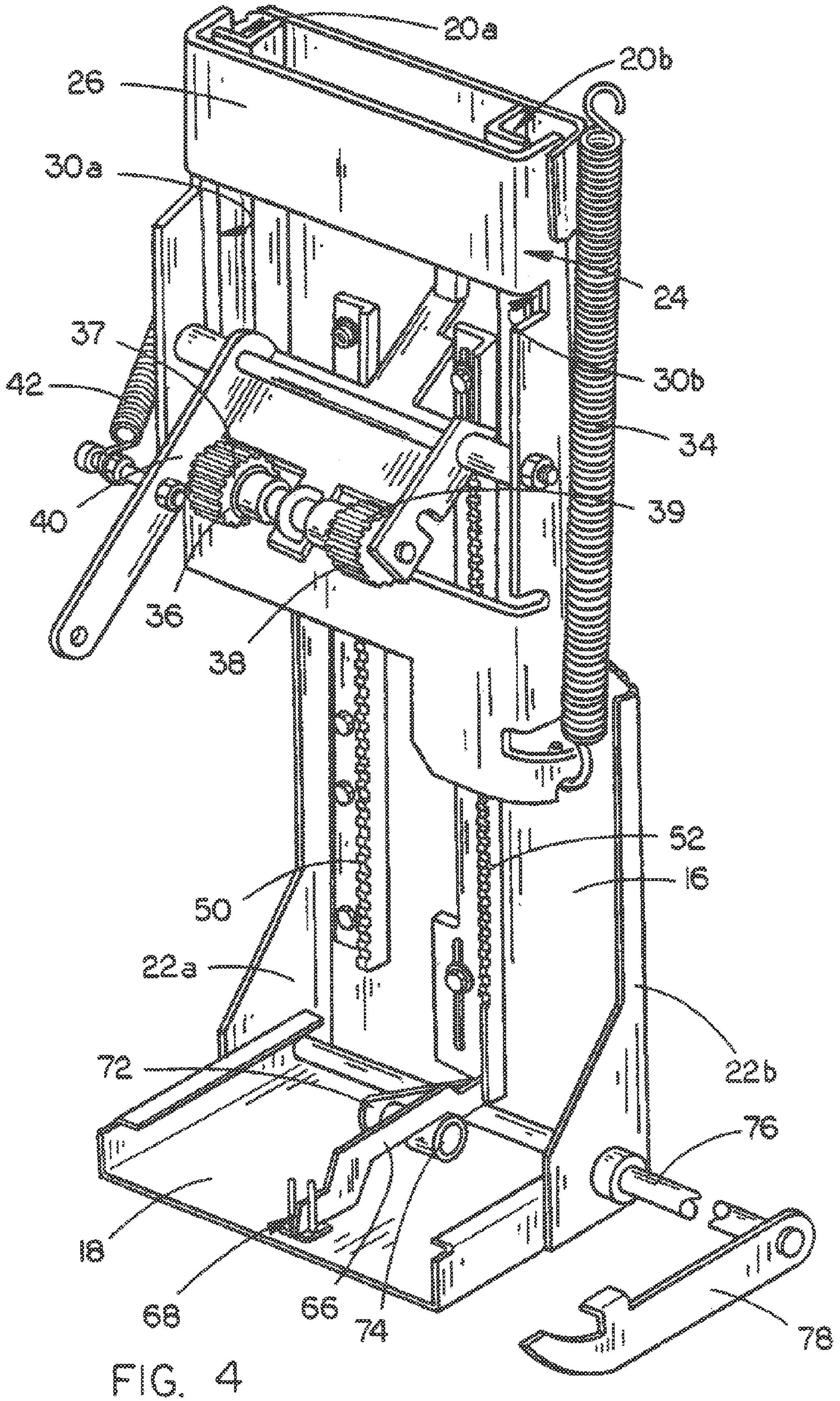
FIG. 4 is a detail view of the lifting mechanism of the elevator system.
Figure 6:
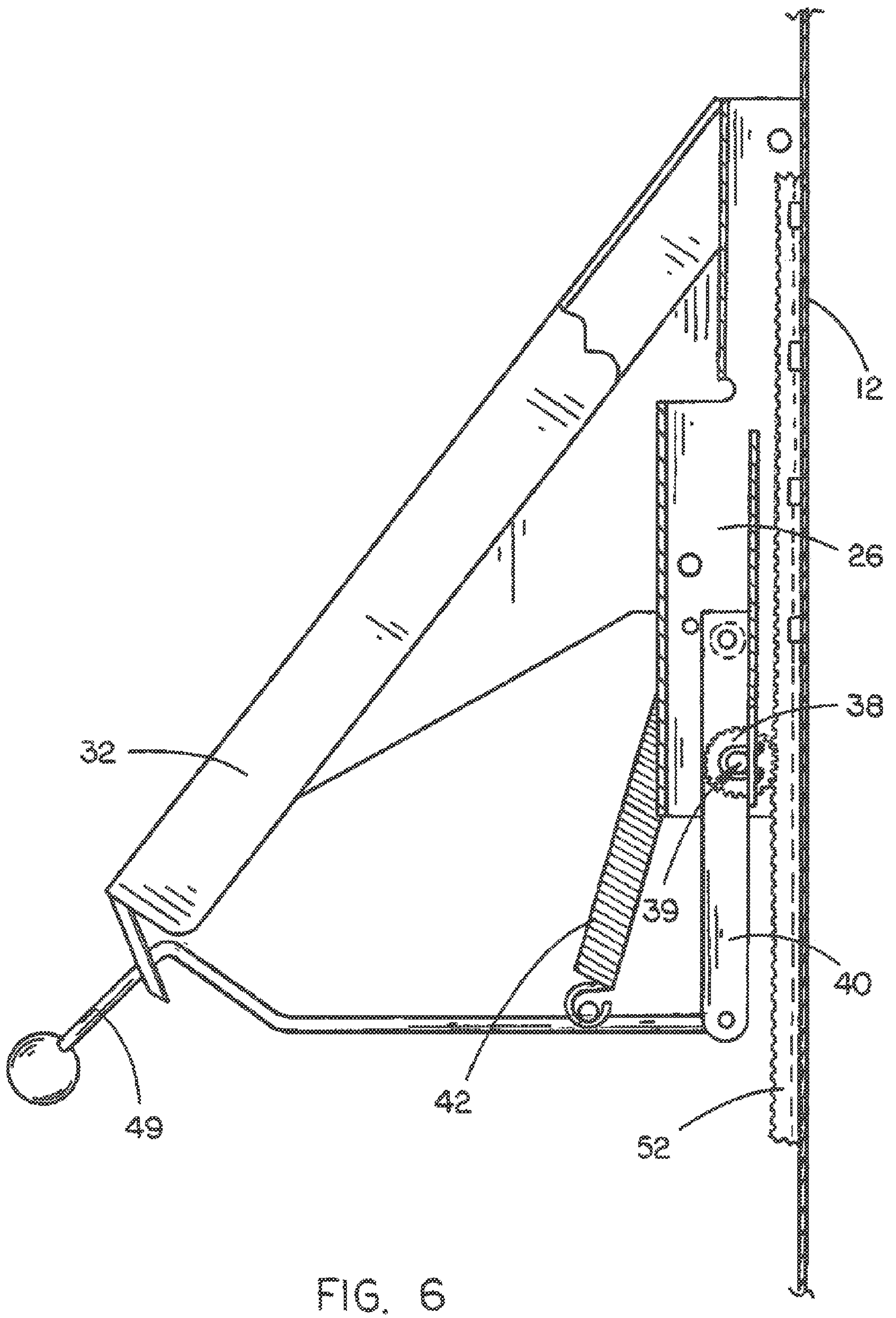
FIG. 6 is a partial detail side elevational view of the newspaper support trolley of the present invention.
Figure 7:
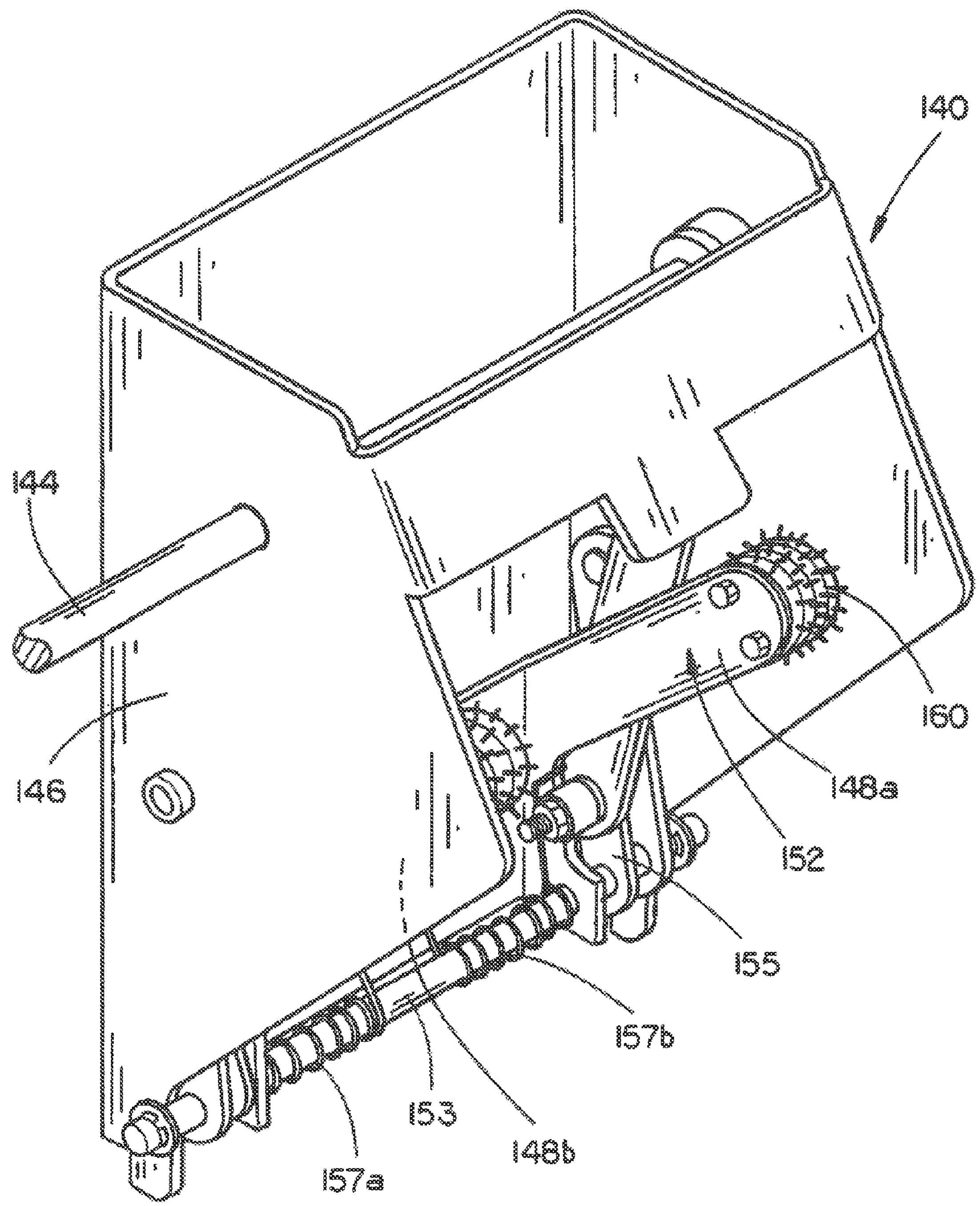
FIG. 7 is a partial detail perspective view of the pusher mechanism of the present invention.

Vertically movably mounted on slide track 16 is a newspaper support trolley 24 which, in the preferred embodiment, includes a rear trolley section 26 and a front newspaper support plate 32 which extends forwards and downwards from the upper part of rear trolley section 26 as shown in FIGS. 4 and 6. In the preferred embodiment, newspaper support plate 32 would be constructed of medium gauge sheet metal and would be inclined rearwardly at an angle between 30 degrees and 60 degrees although it is preferred that the actual angle of the newspaper support plate 32 be approximately 40 degrees. Mounted on the rear trolley section 26 adjacent to slide track 16 are a pair of track follower devices 30*a* and 30*b* which are preferably channel-engaging wheels designed to fit within and be in contact with the channels 20*a* and 20*b* on slide track 16. In this manner, newspaper support trolley 24 may travel in a generally vertical plane as directed by channels 20*a* and 20*b* and track follower devices 30*a* and 30*b*.

Also, for biasing the newspaper support trolley 24 upwards to partially counteract the weight of the stack of newspapers supported thereon, a spring 34 is connected to an extension of rear plate 26 and extends upwards to connect to the slide track 16 at a point generally adjacent the top of slide track 16. The spring 34 assists the rack and gear mechanism which will be described in the following paragraph.

Mounted on the rear plate 26 of newspaper support trolley 24 are first and second rack-engaging gear wheels 36 and 38, each of which are rotatably mounted on a pivoting support mount 40, which is best shown in FIG. 4. The first gear wheel 36 is designed to engage a vertically mounted fixed toothed rack 50 which, in the preferred embodiment, is a toothed gear rack which extends approximately from the base of slide track 16 to top of side track 16 and is aligned collinearly with the direction of motion of the newspaper support trolley 24 up and down slide track 16. The fixed toothed rack 50 is preferably bolted to the slide track 16 at various points along the rack 50 to prevent movement of rack 50. The second gear wheel 38 is designed to engage a vertical moveable toothed rack 52, the vertically movable toothed rack 52 being free to move along a vertical line parallel with the line of movement of the newspaper support trolley 24 such that the second gear wheel 38 traveling on newspaper support trolley 24 engages toothed rack 52 at substantially all locations along toothed rack 52.

Figure 5:
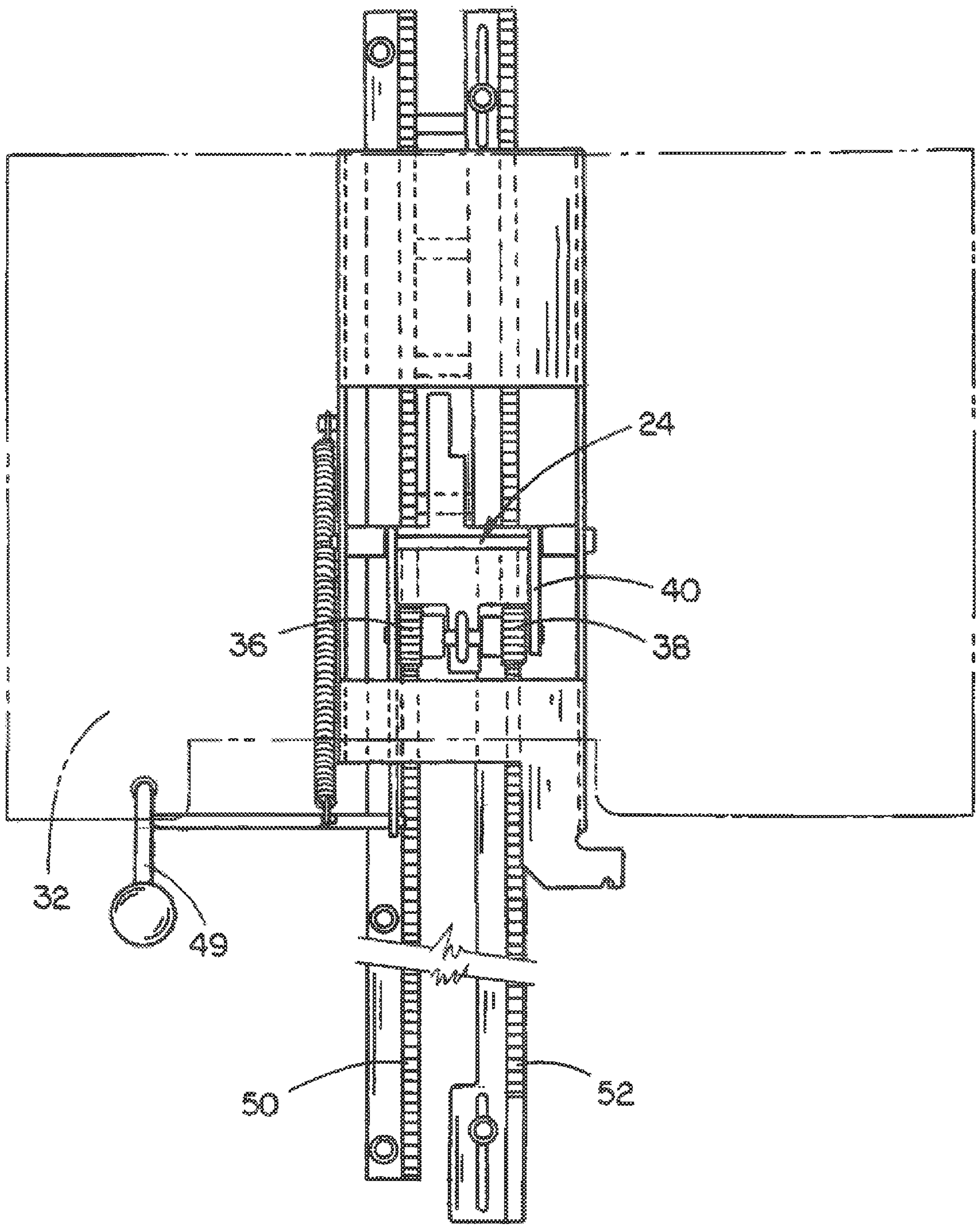
FIG. 5 is a front elevational detail view of the lifting mechanism of the elevator system.

As shown best in FIGS. 4 and 5, pivoting support mount 40 is pivoted into an engagement position such that the first and second gear wheels 36 and 38 engage the respective toothed racks 50 and 52. A biasing spring 42 extends between pivoting support mount 40 and the newspaper support trolley 24 such that pivoting support mount 40 is releasably secured in the engagement position as shown best in FIGS. 5 and 6. It is an important feature of the present invention that first and second gear wheels 36 and 38 each include a respective clutch assembly 37 and 39 mounted within each of the first and second gear wheels 36 and 38, the clutch assemblies 37 and 39 operative to prevent rotation of the first and second gear wheels 36 and 38 in either direction, rather permitting rotation of the gear wheels 36 and 38 in a single direction only. Specifically, clutch assembly 37 in gear wheel 36 permits the first gear wheel 36 to rotate in a clockwise direction, but prevents counter-clockwise rotation, as it is gear 36 which prevents newspaper support trolley 24 from moving downward when gear wheel 36 is engaged with tooth rack 50. The weight of the newspapers on the newspaper support trolley 24 would normally force the trolley to go downwards despite the biasing effect of biasing spring 34, but the presence of clutch 37 in gear wheel 36 prevents this rotation thus preventing downwards trolley movement when the gear wheel 36 is engaging rack 50. The reloading of newspapers would be performed by pivoting the gear wheels 36 and 38 away from racks 50 and 52 through outward movement of mount pivot bar 49 and then moving the newspaper support trolley 24 downwards along slide track 16. The papers are then placed on the newspaper support plate 32 and the pivoting support mount 40 is then rotated to reengage the gear wheels 36 and 38 with the toothed racks 50 and 52. The single vend newspaper machine 10 is then "primed" as will be described below.

Mounted on and extending upwards from the forward end of the base 18 is a forward bulkhead 54 which, in the preferred embodiment, would be a generally vertical sheet metal plate which includes rearwardly extending tabs to provide additional structural strength to the bulkhead 54. Vertically movably mounted on forward bulkhead 54 on the rearward side thereof is a newspaper thickness sensing bar 56 which is a generally flat steel bar including a generally horizontal foot section 58, two or more vertical connection slots 60*a* and 60*b* and an angled paper-engaging tab 62 which preferably extends generally parallel with the newspaper support plate 32 and extends over and above newspaper support plate 32 such that the top most paper on the stack of newspapers may be engaged by the underside of paper-engaging tab 62. Newspaper thickness sensing bar 56 is preferably biased upwards slightly by a spring (not shown) to at least partially offset the weight of newspaper thickness sensing bar 56 and to allow for easier vertical movement of the newspaper thickness sensing bar 56. As shown best in FIGS. 3 and 4, vertically movable toothed rack 52 is connected to newspaper thickness sensing bar 56 by a strut 66 which is welded at one end thereof to vertically movable toothed rack 52 and includes at the opposite end thereof a generally horizontal foot 68 positioned such that foot 68 of diagonal strut 66 is seated on horizontal foot 58 of newspaper thickness sensing bar 56. In this manner, vertical movement of newspaper thickness sensing bar 56 is translated directly to vertical movement of vertically movable toothed rack 52 such that when newspaper thickness sensing bar 56 falls a particular distance, vertically movable toothed rack 52 falls exactly the same distance. The coordinated functionality of each of the above-described features will be set forth below in connection with the operation of the door-mounted internal features of the single-vend newspaper vending machine 10.

For lifting the vertically movable toothed rack 52, a lift bar 72 and end-mounted roller 74 are fixedly mounted on a pivoting lift rod 76 which is rotatably mounted extending generally horizontally through base 18 to be attached to a lever arm 78 which extends perpendicular to lift rod 76 and forwards therefrom. In this manner, lifting of lever 78 results in rotation of lift rod 76, which thus rotates lift bar 72 and causes roller 74 to contact the underside of strut 66. As lever 78 is further rotated, the roller 74 engaging strut 66 pushes diagonal strut upwards thus forcing vertical moveable toothed rack 52 upwards likewise. Due to the engagement of second gear wheel 38 with vertical moveable toothed rack 52, and the fact that counter-clockwise rotation of the second gear wheel 38 is prevented by clutch 39, as the vertical moveable toothed rack 52 moves upwards, the newspaper support trolley 24 is moved upwards also, thus positioning the next paper in the rack for distribution. Of course, the extent to which roller 74 may raise strut 66 is limited by the length of lift bar 72 and, therefore, the length of lift bar 72 is critical to the invention as it is that length which determines the extent to which the vertically movable toothed rack 52 will be raised. In the preferred embodiment, the length of lift bar 72 would be such that the topmost paper on the stack would be moved to the proper dispensing position each and every time. An adjustment device such as a screw, inserted washers or the like may be included for fine adjustment of the position of the topmost newspaper the operation of which would be understood by those skilled in the art.

Figure 3:
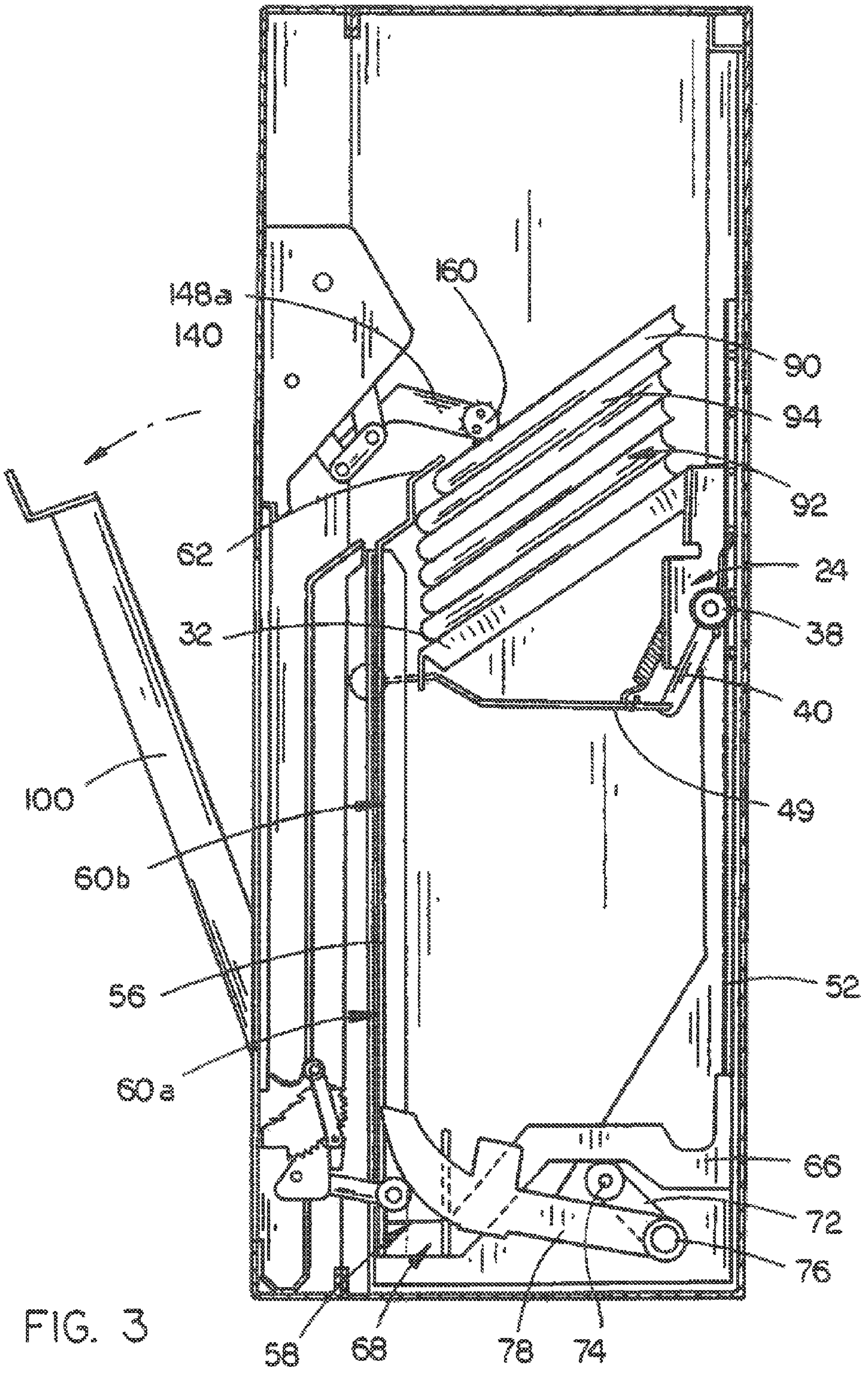
FIG. 3 is a side detail elevational view of the present invention showing the internal features thereof.

To further assist in the lifting of the vertically movable toothed rack 52, a spring (not shown) preferably extends upwards from adjacent the base of vertically movable toothed rack 52 to a point above on slide track 16 as shown in FIG. 3 to bias vertically movable toothed rack 52 upwards to at least partially offset the weight of vertically movable toothed rack 52 and strut 66.

Figure 11:
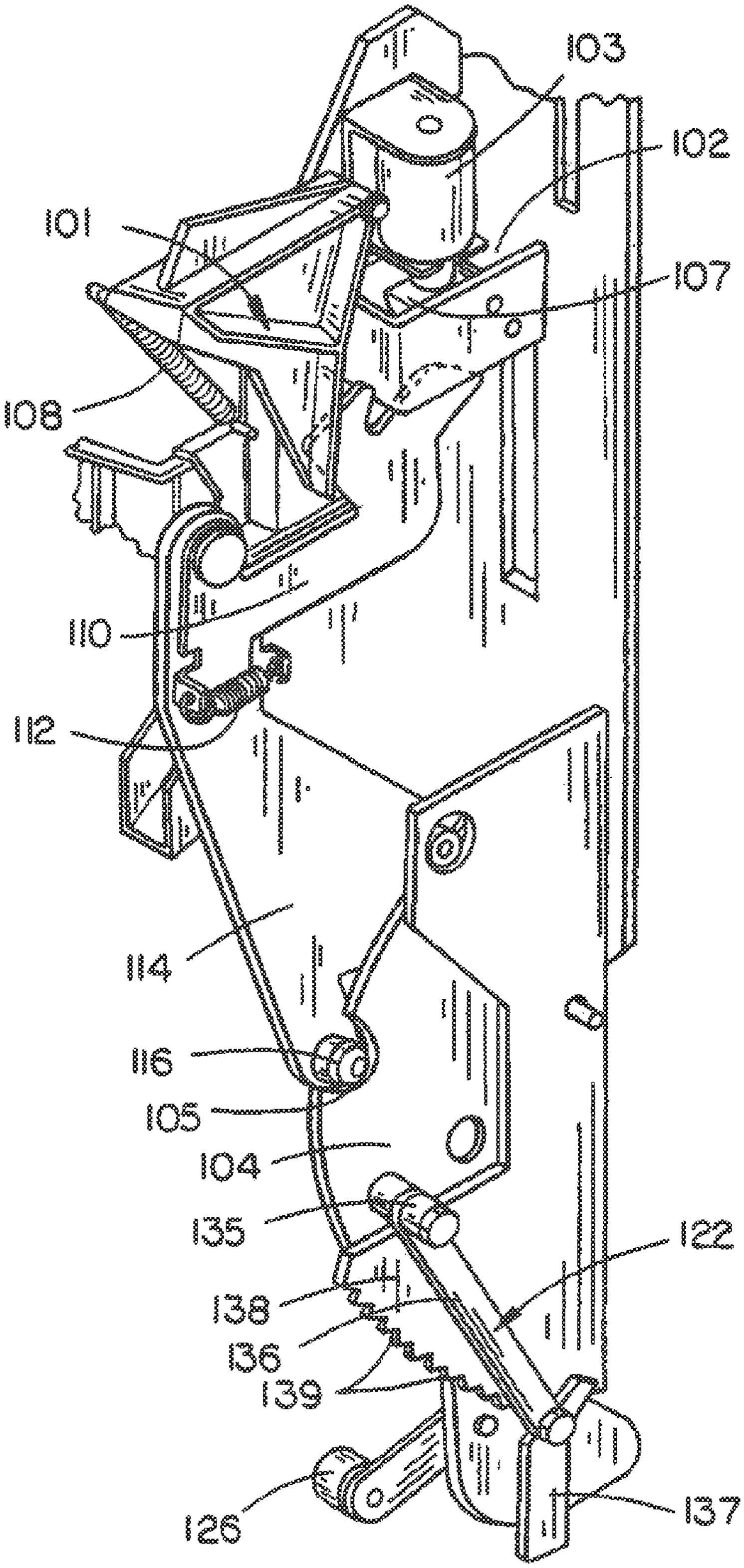
FIG. 11 is a partial detail perspective view of the door operation mechanism of the present invention.
Figure 12:
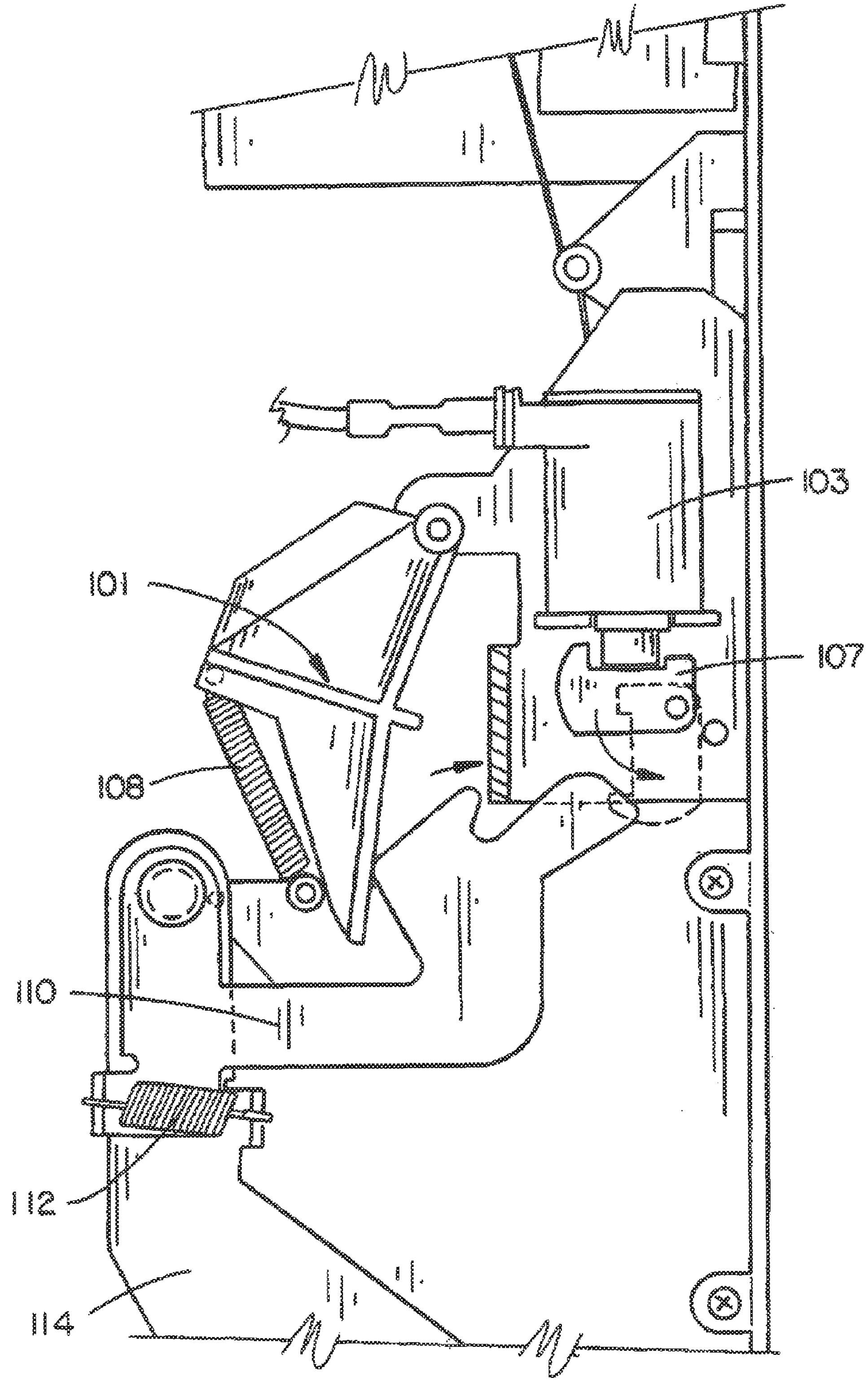
FIG. 12 is a partial detail perspective view of the upper section of the door operation mechanism of the present invention prior to insertion of coins.
Figure 13:
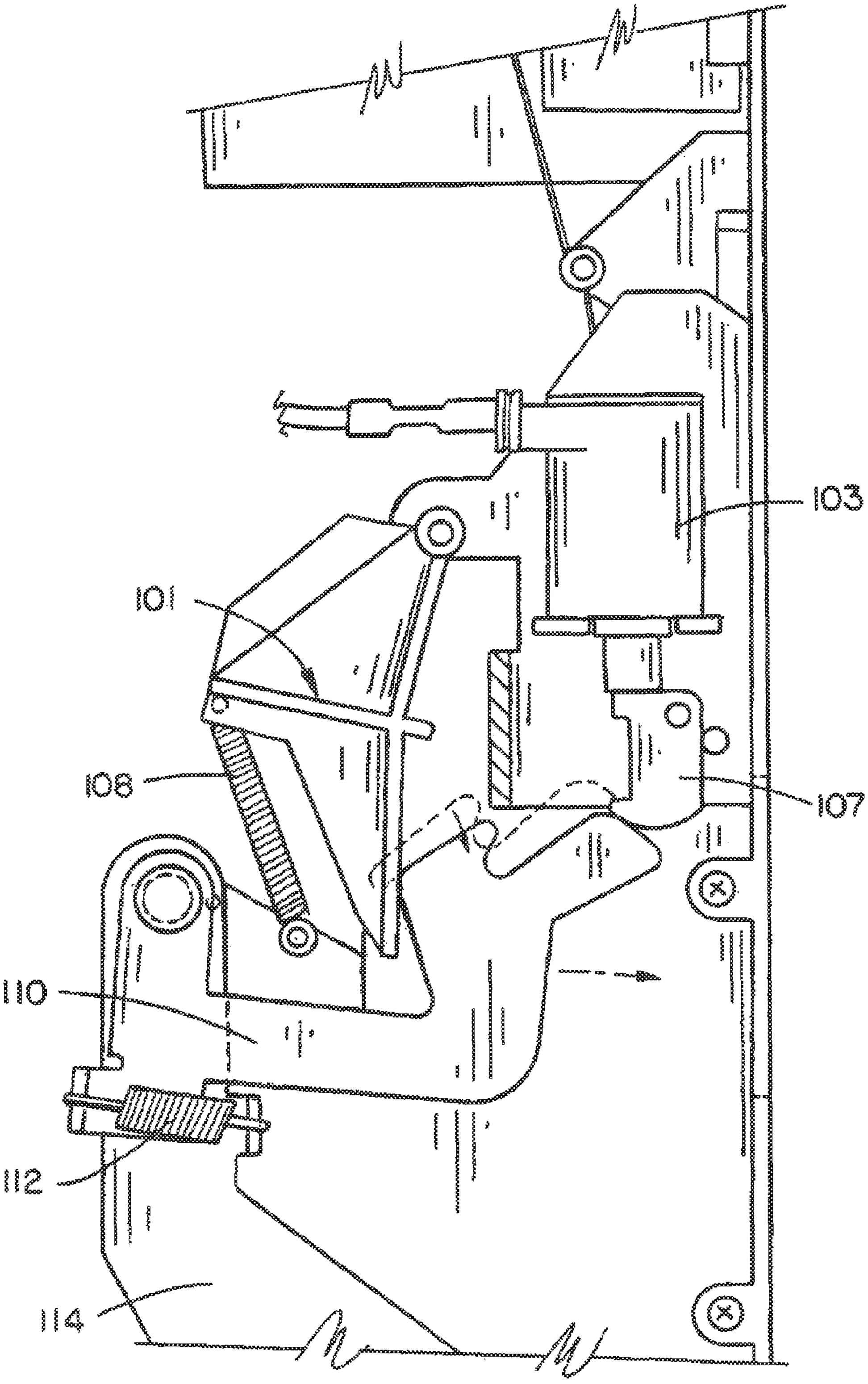
FIG. 13 is a partial detail perspective view of the upper section of the door operation mechanism of the present invention after insertion of coins.

The door elements of the single vend newspaper vending machine 10 are best shown in FIGS. 2, 3 and 7-21 as including an operating handle 100 which is hinge mounted on the front of front door 14 as shown in FIGS. 1-3. As coins are inserted into the coin intake slot 98, a standard coin intake mechanism 101 accepts the coins, ascertains that the correct coin amount has been inserted, and deposits them in a coin deposit box 84 shown best in FIG. 2. Once the appropriate coins are fed into the coin intake mechanism 101, solenoid 103 fires which pivots bar 107 downwards as shown in FIG. 11-13. Bar 107 preferably includes a curved outer surface which allows the operating handle 100 to then be pulled forward by a person desiring the dispensing of a newspaper from the single vend newspaper vending machine 10, the operation of which will be described hereafter. The operating handle 100 is operatively connected to several different actuating mechanisms, but the main actuating mechanism is shown best in FIG. 11 as including a generally upright plate 104 mounted on and extending downwards from the lower end of the operating handle 100, the plate including a semicircular cut 105 on the inner edge thereof, as shown in FIG. 11. The upwardly projecting leg of L-shaped arm 110 butts against bar box 102 when the handle 100 is pulled forward prior to the tripping of bar 107. When the handle 100 is pulled forward prior to the insertion of the correct amount of coins, stopping roller 116 prevents the handle from opening due to the roller 116 being seated in semicircular cut 105. Once the correct amount of coins are input, solenoid 103 fires which pivots bar 107 downwards. L-shaped arm 110 is pivoted downwards and the pivot stop arm 114 which is pivotably connected to the frame adjacent arm 110 pivots slightly clockwise to disengage the stopping roller 116 mounted on stop arm 114 away from the semicircular cut 105 and permitting rotation of the handle 100. The stopping roller 116 rolls along the inner edge of the upright plate 104, and as the roller 116 does so, the L-shaped arm 110 is moved forwards towards the handle 100. The curved outer surface of bar 107 causes the L-shaped arm 110 to slide on the bar 107 until the rearward-pointing upper triangular section of the arm 110 is moved past the curved surface of the bar 107. After the handle 100 has been fully opened, as the handle 100 returns to its closed position, the rearward-pointing upper triangular section of the arm 110 moves back past the curved surface of the bar 107 and forcibly pivots the bar 107 upwards to return the bar 107 to its original position. The device thus resets until the proper coinage is input. The remaining features in FIGS. 11-13 are merely elements of a standard coin input device and are not elements of the present invention. It is to be further understood that minor modifications of the elements described herein may be necessary to accommodate different types of coin intake mechanisms, but the operation, construction and arrangement of the elements will remain generally similar. It should be noted that because each of the elements of the door securement system are inside the machine housing 12 and the front door 14, it will be substantially more difficult for a user of the present invention to sabotage the operation of the device, as opposed to those devices found in the prior art which have the latch or other such door access control elements exposed when a paper is dispensed.

Also, connected to and extending from the lower end of the handle 100 is metal actuating plate 208, which in the preferred embodiment is adjacent operating handle 100 on the interior of the front door 14, the plate 208 connected to operating handle 100 such that rotation of operating handle 100 about its pivot point results in rotation of metal actuating plate 208 about pivot point 210.

Figure 17:
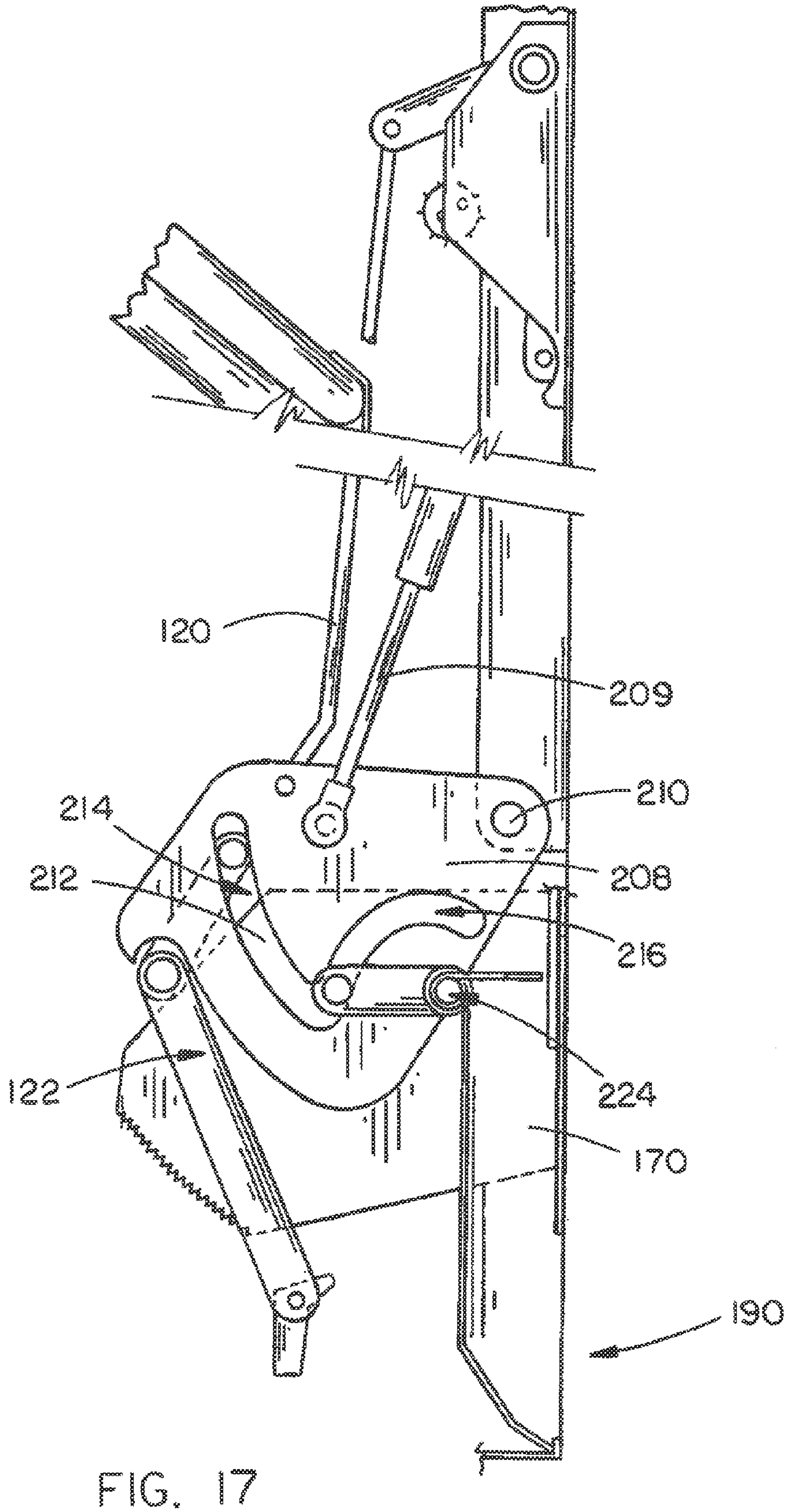
FIGS. 17, 18 and 19 are partial detail side elevational views of the metal actuating plate and functioning thereof.
Figure 19:
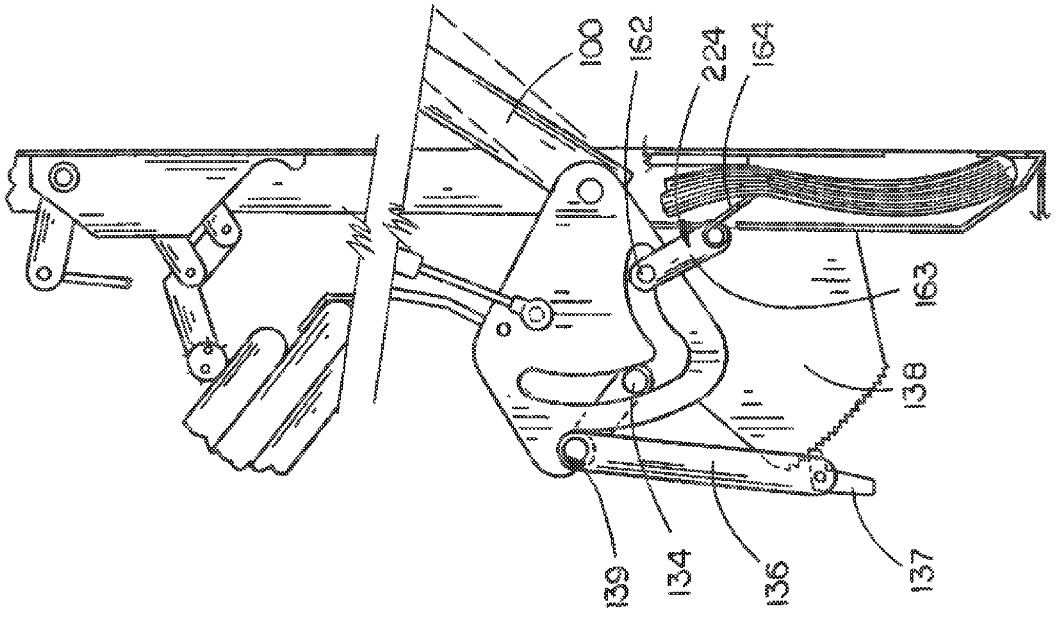
Figure 18:
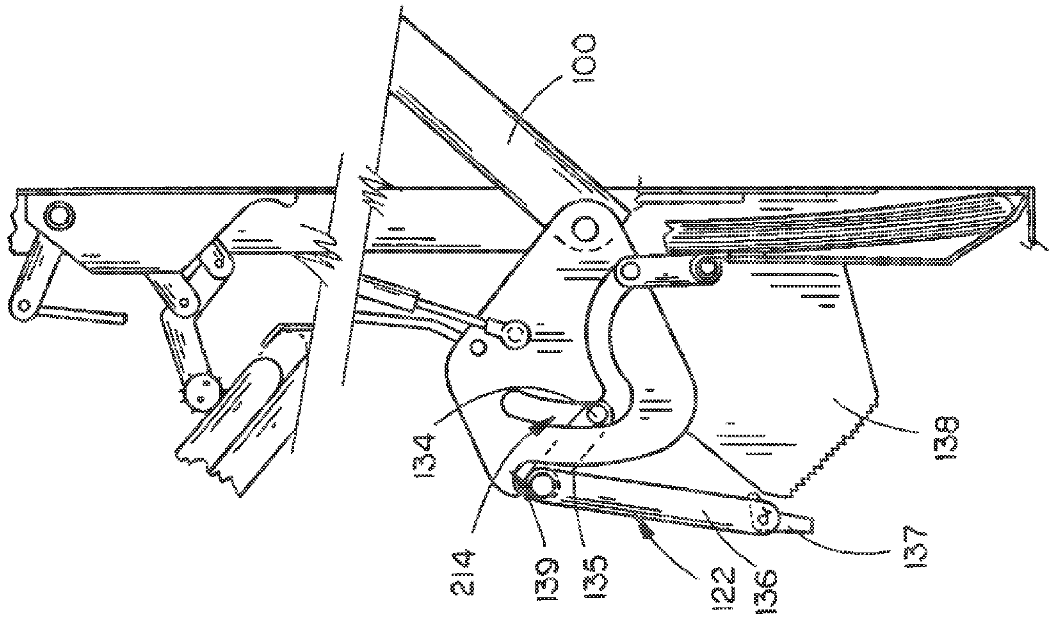
Figure 21:
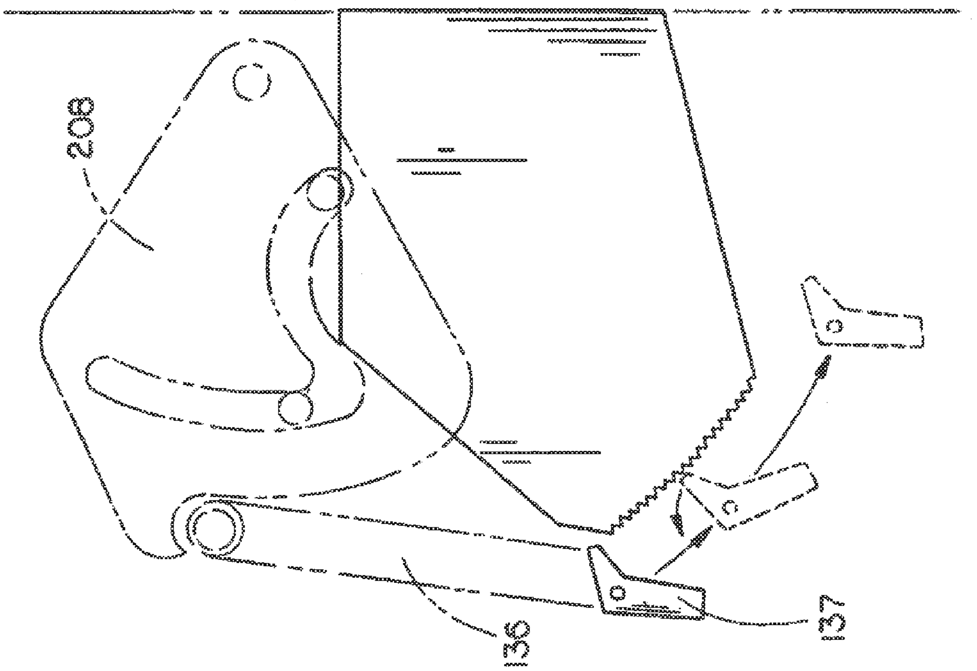
FIGS. 20 and 21 are partial detail side elevational views of the present invention showing the handle return prevention device in operation.
Figure 20:
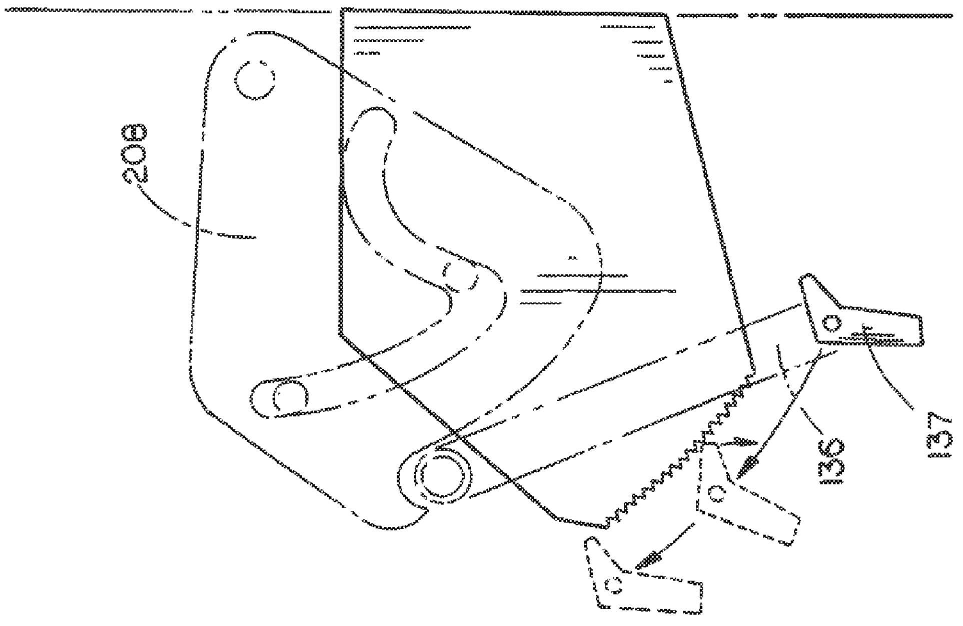

As shown best in FIG. 17, metal actuating plate 208 includes an arcuate slot 212 having left and right legs 214 and 216. Connected to the top of metal actuating plate 208 is a hydraulic cylinder 209 which extends between metal actuating plate 208 and the interior of front door 14 as shown in FIG. 4, the hydraulic cylinder 209 biasing the handle 100 back to its rest position adjacent the door 14. A pusher mechanism actuation bar 120 is connected to plate 208 adjacent hydraulic cylinder 218, the actuation bar 120 extending upwards from metal actuating plate 208 to connect to the newspaper pusher mechanism 140, which will be described below. Finally, a handle return prevention device 122 is mounted on the inner side of metal actuating plate 208, as shown in FIGS. 17-19, the handle return prevention device 122 operative to prevent operating handle 100 from returning to its rest position adjacent to coin intake mechanism 102 unless operating handle 100 has been pulled downwards the full extent permitted by the operating mechanism. FIGS. 11 and 17-19 show the handle return prevention device 122, which includes a shift bar 135 pivotably connected to a ratchet bar 136 at one end thereof and including a transversely extended pin 134 which extends into slot 212. Pivotably mounted on the opposite end of ratchet bar 136 is a ratchet 137 which ratchetably engages a ratchet plate 138 mounted on, and extending inwards from door 14. If the handle 100 is not opened to its full extent and the operator attempts to return the handle 100 to its rest position, the ratchet 137 catches on ratchet plate 138 thus causing ratchet bar 136 to be retained in seat 139 in plate 208 until the operator finishes opening the handle 100 to its full extent. This will prevent operation of the newspaper vending machine 10 in an improper manner. Finally, mounted on paper release chute 170 is a gate mechanism 224 which prevents release of a paper to the paper release chute 170 until the operating handle 100 is pulled.

Figure 14:
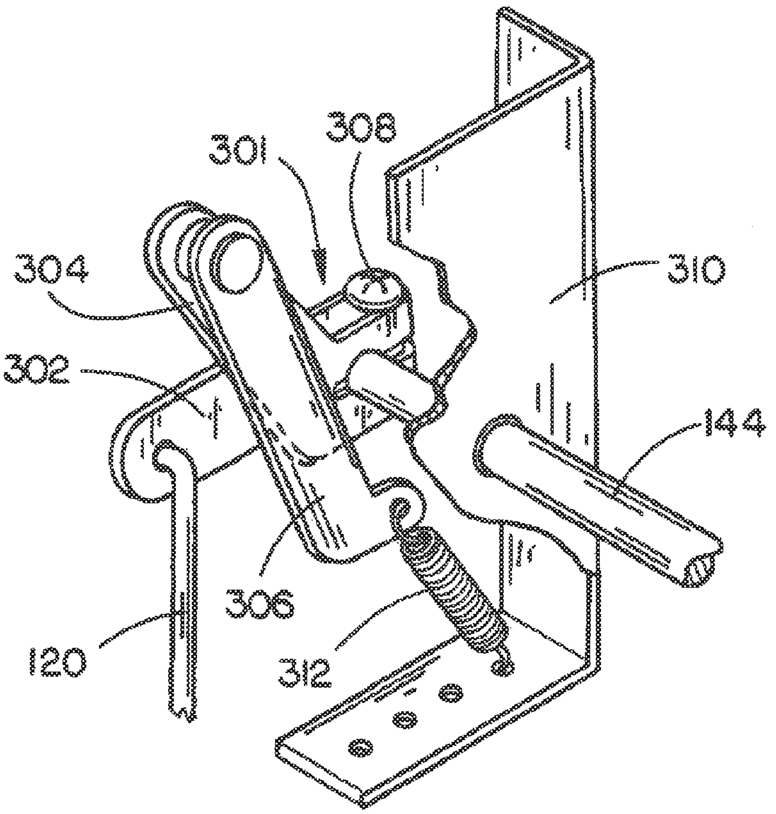
FIGS. 14, 15 and 16 are partial detail perspective views of the overcentering device connected to the newspaper pusher mechanism showing the operation thereof.
Figure 15:
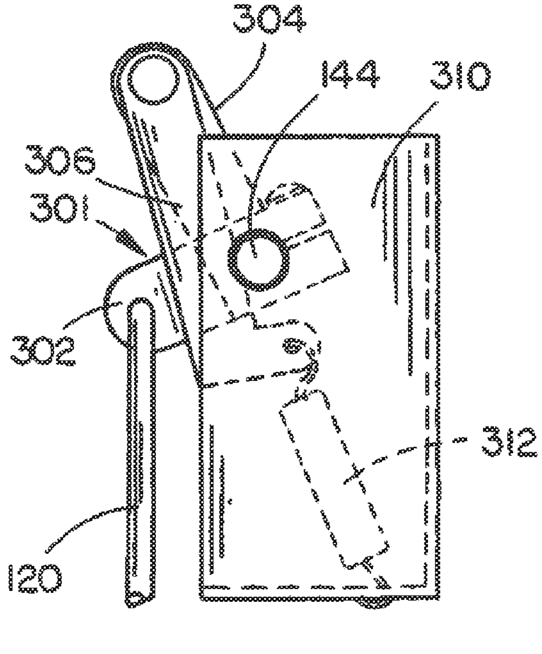

The operational characteristics of the front door mechanisms can best be described in terms of sequential operations taking place as the operating handle 100 is rotated through the full extent of its rotation. First, as the operating handle 100 begins to rotate, the metal plate 104 likewise is rotated, thus causing pusher mechanism actuation bar 120 to move upwards. Pusher mechanism actuation bar 120 is connected at the upper end thereof to an overcentering device 300 which includes a generally Y-shaped yoke 301 fixedly mounted via clamp and screw 308 on a pivot rod 144 which extends generally horizontally through left chute wall 126 and extends across the pusher mechanism 144 as shown in FIG. 4. The yoke 301 includes a generally horizontal arm 302 and a upwardly extending arm 304, actuation bar 120 connected to the outer end of arm 302 and arm 304 pivotably connected to L-shaped arm 306 as shown in FIG. 14. The lower end of L-shaped arm 306 is connected to bracket 310 via biasing spring 312 which operates to bias the lower end of L-shaped arm downwards. The overcentering device 300 is important to the present invention as it provides additional force for the removal of the paper-engaging needles of pusher mechanism 140 during the paper moving phase of the dispensing process, as will be described herein.

Figure 16:
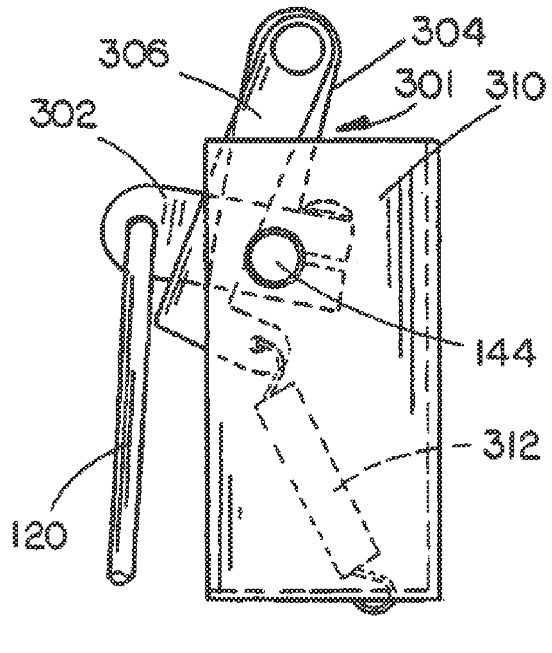

As actuation bar 120 is moved upwards, arm 302 is moved upwards pivoting yoke 301 and therefore pivot rod 144 in a clockwise direction. At the rotation point shown in FIG. 15, L-shaped arm 306 has just contacted pivot rod 144 and spring 312 has not been extended, and thus the return mechanism (i.e. hydraulic cylinder 209) for the handle 100 provides the only rotational force being applied to pivot rod 144. Upon exceeding the rotational point shown in FIG. 15, the continued upward movement of the actuation bar 120 pivots L-shaped arm 306 around pivot rod 144, as shown in FIG. 16, and spring 312 is thus extended to bias L-shaped arm 306 back to its original pre-handle operation location. The biasing force of spring 312 is added to the force of hydraulic or pneumatic cylinder 209 and additional retracting force is thus applied to the pusher mechanism 144 to enable retraction of the needles from even large papers. Upon returning to the rotational location of FIG. 15, the additional force of biasing spring 312 is lessened and the handle 100 is returned to its original location by the operation of cylinder 209. The cylinder force also controls the operation of the paper gate as will be explained later in this disclosure, but it is important to note that the force applied to the gate is such that damage to the paper is avoided. Such judicious application of force would not be possible without the operation of the overcentering device as described above, and thus it is believed that the presently described overcentering device is an important feature of the present invention.

Pusher mechanism 140 is preferably held within a generally U-shaped pusher mechanism housing 146 which houses a pair of pusher arms **148*a* and 148*b* which are operatively connected to pusher rod 144 such that rotation of pusher rod 144 results in extension of pusher arms 148*a* and 148*b*. FIGS. 7-10 disclose one variation of the operative connection between pusher rod 144 and pusher arms 148*a* and 148*b*, although it is to be understood that numerous modifications to the pusher mechanism 140 may be incorporated in the present invention so long as the basic functionality of the pusher mechanism 140** is not impaired.

In the preferred embodiment, the engagement mechanism for pusher arms **148*a* and 148*b* includes elements on each side of the housing 146 and, therefore, the following description of the connection elements adjacent pusher arm 148*a* which operatively connect pusher arm 148*a* to pusher rod 144 should be understood to apply to the connection elements adjacent pusher arm 148*b*. Pusher arm 148*a* preferably includes an angle of approximately 45 degrees and is divided into a connection leg 150 and an engagement leg 152 which has at the end thereof a needle-equipped engagement wheel 160. The end of connection leg 150 is pivotably connected to a lower rod 153 which permits rotation of pusher arm 148***a* thereabout. A connection strut 154 extends from and is pivotably connected to lower rod 153 via short link 155, with the connection of connection strut 154 to connection leg 150 being a pivotable connection. Rotation of pusher rod 144 clockwise thus results in pusher arm 148*a* being pivoted away from the outer wall 132 of front door 14. To direct the movement of pusher arm 148*a* as desired to engage the topmost paper 90 on the stack 92, a guide link 156 extends between a pivotable connection mounted on the housing 146 adjacent outer wall 132 of front door 14 and is rotatably connected to lower rod 153. Guide link 156 directs the movement of pusher arm 148*a* so that engagement leg 152 is moved forwards and downwards to engage the topmost paper 90 on the stack 92. Coiled springs 157*a* and 157*b* bias pusher arms 148*a* and 148*b* forwards and allow independent pivoting motion of the pusher arms 148*a* and 148*b* relative to one another to accommodate newspapers having odd-shaped inserts or the like.

Figure 9:
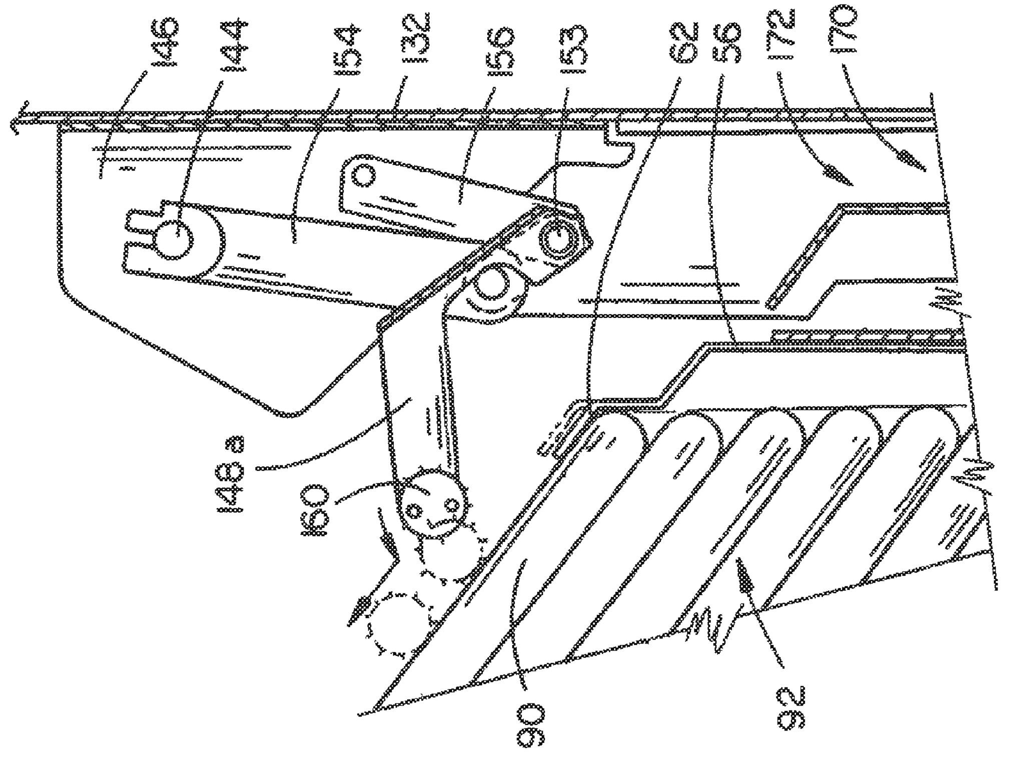
FIGS. 8, 9 and 10 are partial detail side elevational views of the pusher mechanism of the present invention in operation.
Figure 8:
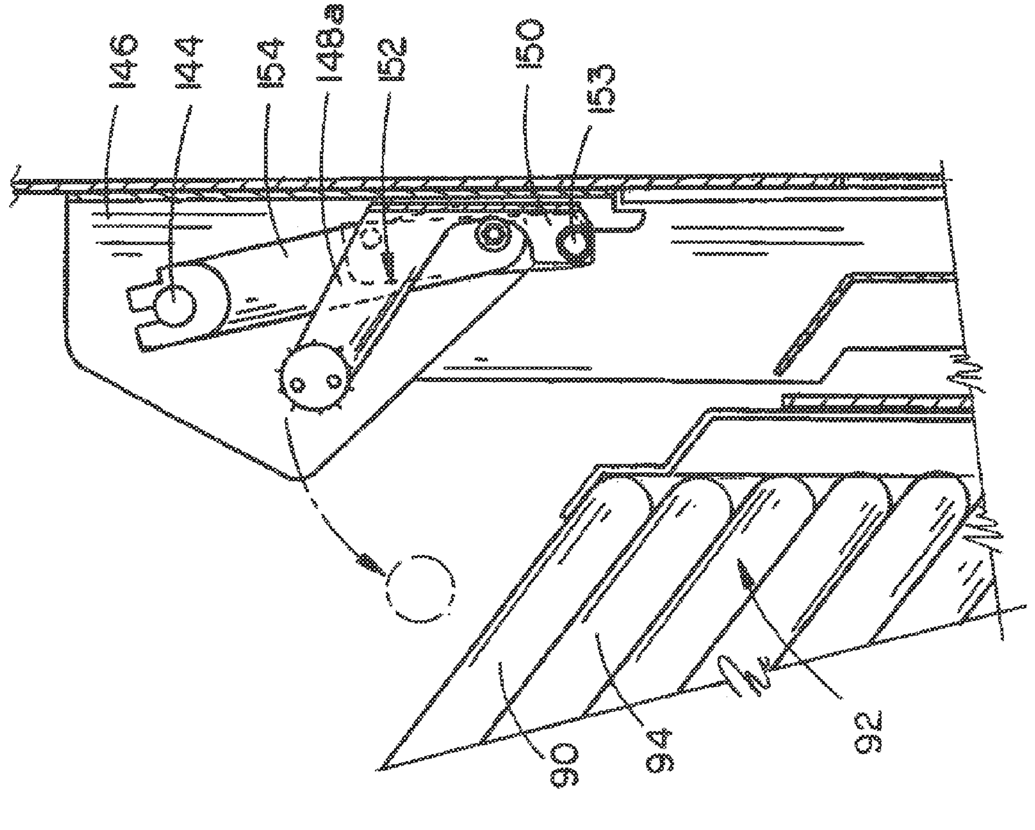
Figure 10:
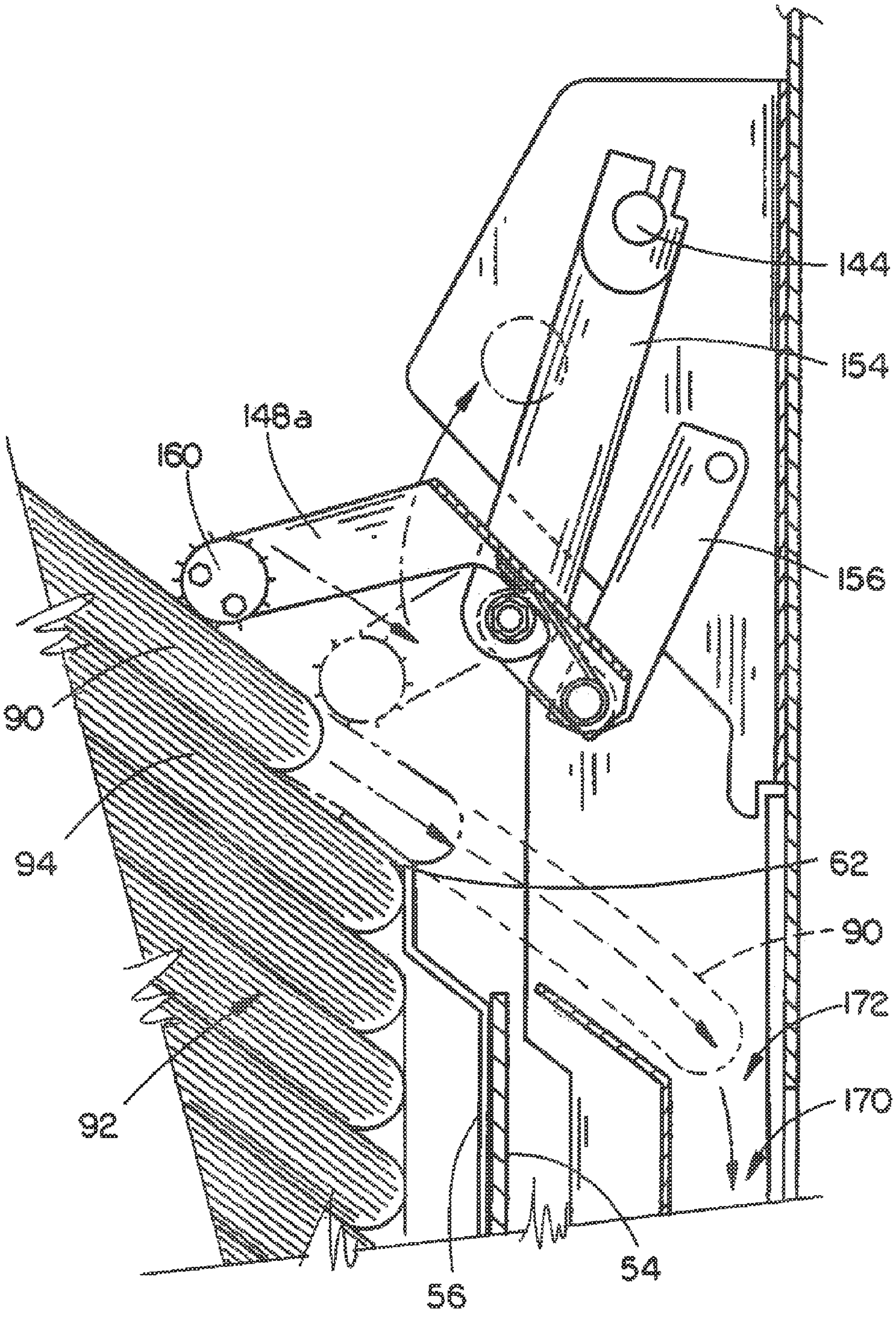

The pusher mechanism 140 thus operates in the following manner. As actuation bar 120 is moved upwards, overcentering device 300 is engaged as described above thus and pusher rod 144 is rotated in a clockwise manner. The rotation of pusher rod 144 moves connection strut 154 outward from outer wall 132 of front door 14 thus pivoting the pusher arms 148*a* and 148*b* from a rest position as shown in FIG. 8 to an engagement position as shown in FIG. 9. As rotation of overcentering device 300 continues, connection strut 154 is further rotated and guide link 156 causes the engagement leg 152 and engagement wheel 160, and the needles thereon, to remain in contact with the topmost paper 90 thus forcing the topmost paper 90 rearward and upwards on the stack 92. The topmost paper 90 is thus removed from underneath the newspaper thickness sensing bar 56 and specifically the paper-engaging tab 62, allowing the newspaper thickness sensing bar 56 to fall downwards to contact the next highest paper 94 on stack 92. The overcentering device 300 is particularly necessary when thicker and heavier papers are being dispensed, as the needles on the engagement wheel 160 need to be securely pressed into the paper for proper dispensing. The additional force supplied by biasing spring 312 enables the proper operation of the invention in such situations.

When operating handle 100 is returned to its rest position, the pusher rod 144 is rotated counter-clockwise, thus reversing the motion of pusher arms 148*a* and 148*b* and allowing the topmost paper 90 to move downwards and forwards over the paper-engaging tab 62 of newspaper thickness sensing bar 56. As the pusher arms 148*a* and 148*b* return to their rest position, they disengage from the topmost paper 90 and gravity takes over as the topmost paper 90 slides forwards and downwards into the opening 172 of paper release chute 170. Because the elevator system has already moved the next highest paper 94 on the stack 92 to the position of the previous topmost paper 90, the entire process is ready to begin again.

Also occurring as operating handle 100 is rotated, the display paper 180, shown best in FIG. 1, is dispensed as the actuating plate 208 causes the gate mechanism 224 at the bottom of chute 170 to open. Gate mechanism 224, shown best in FIGS. 18 and 19, includes a gate bar 163 which is connected at one end to the gate 164 itself and at the other end to a pin 162 which extends transversely through right leg 116 of slot 112. Gate 164 is pivotably mounted adjacent chute 170 and closes off chute 170 when the handle 100 is in rest position. As the handle 100 is rotated, the pin 162 within slot 112 slides and causes rotation of the gate 164 to an open position, as shown in FIG. 18. In FIG. 19, it is shown that if the display paper 180 is not removed, the gate 164 cannot close, and thus the newspaper pusher mechanism 140 cannot return to rest position and therefore the paper 90 being held by the newspaper pusher mechanism 140 will not be released. In this manner, the dispensing of only a single newspaper is guaranteed.

The overcentering device 300 contributes to the operation of the present invention by providing additional force for the removal of the paper-engaging needles from the newspaper being dispensed without adding force to the closing of gate 164, which could result in paper damage and thus render the present invention unusable. It is important that the some type of newspaper pusher removal device that operates to increase the needle-removing force but which is isolated from the gate closing force, such as the above-described overcentering device 300, be provided, although it should be noted that numerous types of devices could be used which accomplish the same desired result.

The lever-engaging bar 124 and roller 126 thereon engages the lever 78 during the performing of the above operations and during the rotation of handle 100. The lever-engaging bar 124 pushes the lever 78 upwards thus pivoting lift rod 76, lift bar 72 and roller 74, as shown best in FIGS. 2-4. In FIG. 3, the above-described operations (the operation of the pusher mechanism and the opening of the gate) have occurred or are occurring. It is seen that the lift bar 72 is contacting the strut 66 in FIG. 3, and therefore has begun to move the rack 52 upwards along with the entire newspaper trolley 24. As was described previously, the distance "d" of the upwards shift of newspaper support trolley 24 is exactly equal to the thickness of the topmost newspaper 90 given by the distance fallen by the newspaper thickness sensing bar 56. The engagement of first gear wheel 36 with fixed toothed rack 50 keeps the newspaper support trolley 24 at the same height until the trolley is moved upwards as described above.

It should be noted that once the refilling of newspapers has been completed, the refiller should manually lift lever 78 to set the newspaper support trolley to the correct height. The door 14 is then closed and locked and the handle 100 is operated to dispense the first paper into the display window 182, as shown in FIG. 1, thus "priming" the newspaper vending machine 10. Finally, a locking device 400 would be provided to secure the front door 14 of the invention in the closed position.

Figure 22:
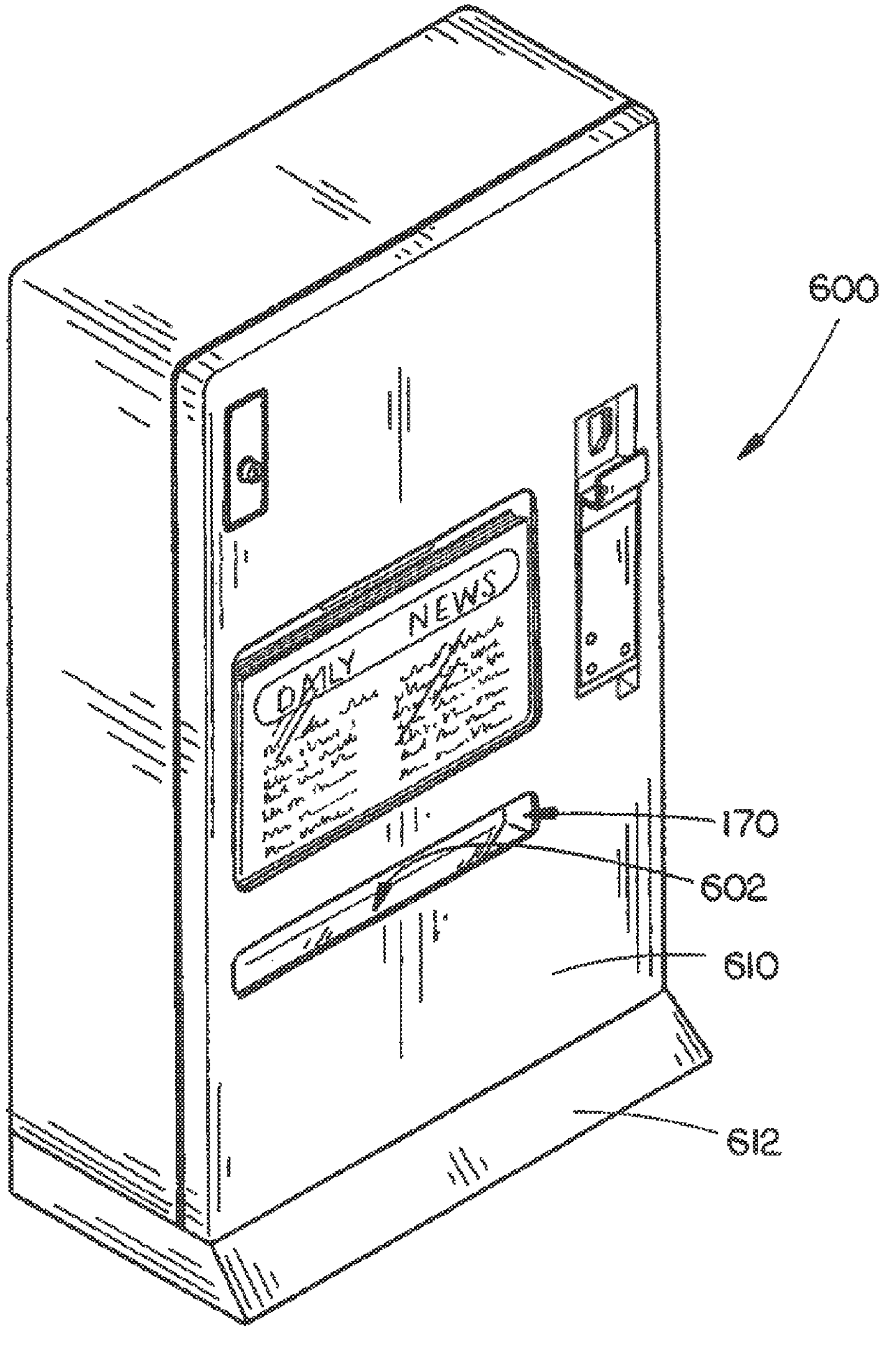
FIG. 22 is a perspective view of the single vend newspaper vending machine of the present invention mounted on a pedestal and including a lower newspaper-receiving support slot into which the newspaper will fall after being dispensed.
Figure 23:
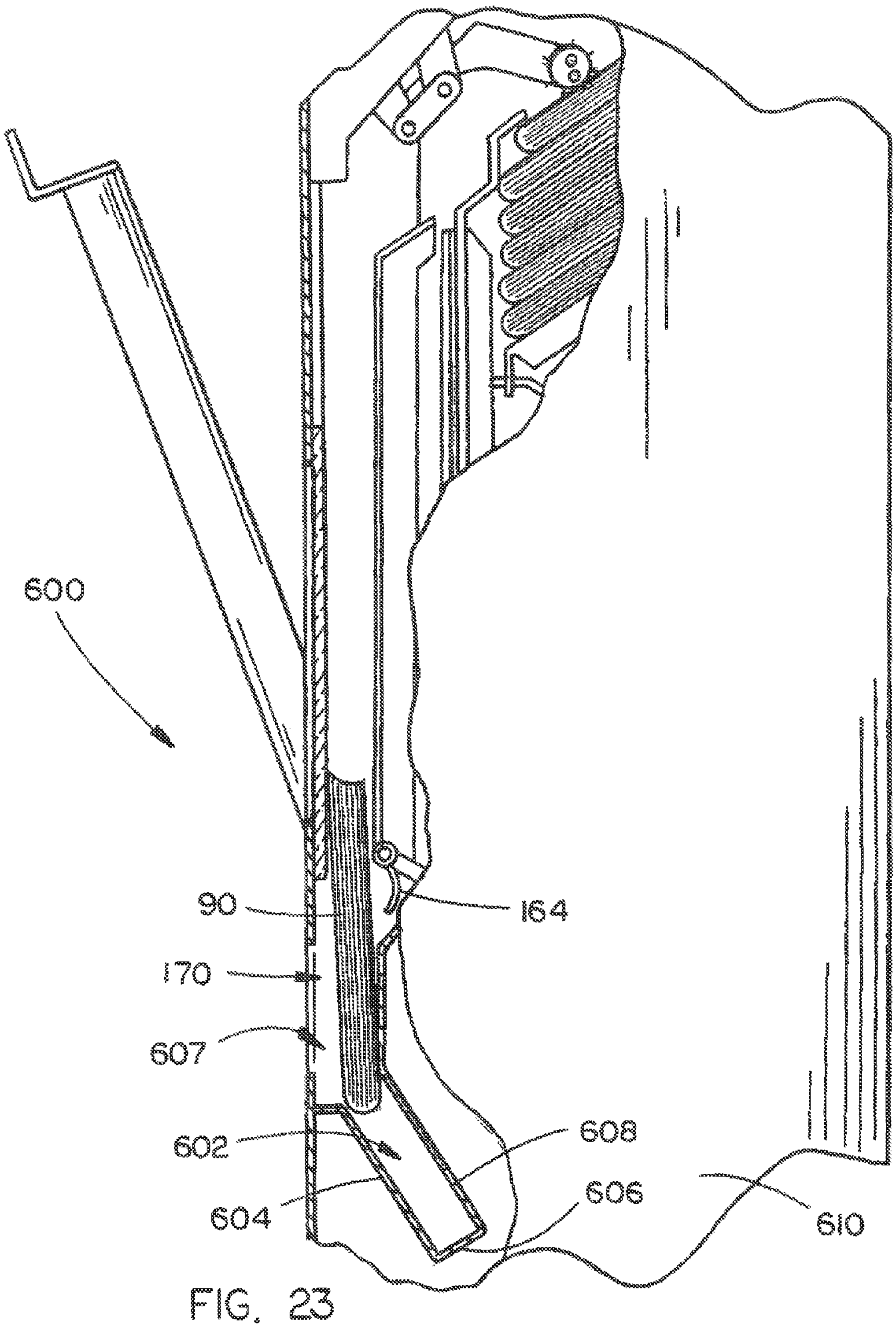
FIG. 23 is a partial detail side elevational view of the embodiment of FIG. 22 showing the lower newspaper-receiving support slot receiving the newspaper therein.
Figure 24:
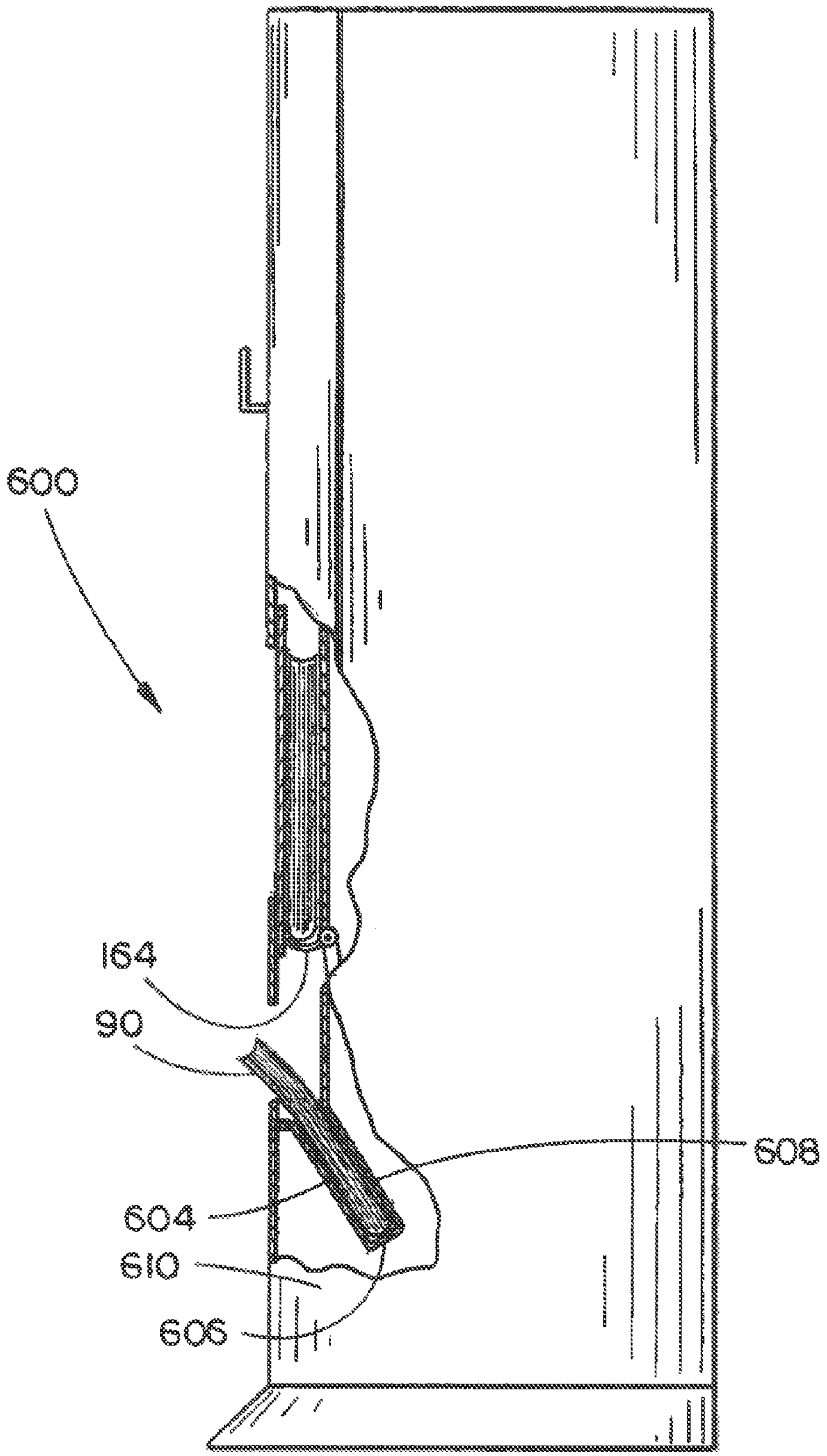
FIG. 24 is a detail side elevational view of the embodiment of FIG. 22 wherein the newspaper has fallen into the slot.

FIGS. 22, 23 and 24 disclose an alternative embodiment of the present invention in which the internal operations of the invention are generally exactly the same as the first embodiment herein. However, it is seen that the second embodiment 600 is designed as a stand-alone unit having a pedestal 610 or the like and it is expected that if a dispensing chute such as that described in connection with the first embodiment were to be used, it is an occasional problem that the newspaper 90 will become jammed in the chute, which is undesirable. Therefore, the variation envisioned by the inventor is that as the topmost paper 90 is removed from the stack of newspapers, it will fall into an output chute which includes a lower newspaper-receiving support slot 602 which is formed in the pedestal 610 and is positioned directly beneath the paper release chute 170, as shown in FIG. 22. In the preferred embodiment, the lower newspaper-receiving support slot 602 would include a rearwardly angled lower wall 604, a base wall 606 extending generally perpendicularly inwards from the base of lower wall 604, an upper wall 608 which extends generally parallel with and above the lower wall 604 and side walls 609*a* and 609*b* which close the left and right sides of the upper and lower walls 608 and 604 to form the generally rectangular box shape of the lower newspaper-receiving support slot 602, with each of the walls of the lower newspaper-receiving support slot 602 preferably being constructed of a long-lasting, weather and damage resistant construction material such as anodized sheet metal or the like. It is further preferred that the lower and upper walls 604 and 608 extend at an angle between 10° and 40° from vertical so that the newspaper 90 will be retained within the lower newspaper-receiving support slot 602 once it has fallen into the slot.

Moreover, the depth of the lower newspaper-receiving support slot 602 will be determined to some extent by the dimensions of the newspaper 90 being vended from the second embodiment 600, specifically in that the upper portion of the newspaper will protrude from the top opening 607 of the lower newspaper-receiving support slot 602 approximately one to three inches (1" to 3") to make available a sufficiently graspable portion of the newspaper 90 above the lower newspaper-receiving support slot 602 so that the person purchasing the newspaper 90 can easily remove the newspaper 90 from the lower newspaper-receiving support slot 602. Therefore, it is preferred that the height of the lower wall 604 be approximately two inches (2") less than the standard height of a newspaper, which, when folded in half for dispensing, is approximately between eight and twelve inches (8" and 12"). Therefore, the preferred depth of the lower newspaper-receiving support slot 602 would be approximately eight inches (8").

As the newspaper 90 drops into and through the paper release chute 170, as shown in FIG. 23, the gate 164 remains open until the newspaper 90 has fallen past it, and then the gate 164 may close in preparation for the next paper in line, as shown in FIG. 23A. The newspaper 90 then falls downwards into the lower newspaper-receiving support slot 602 with the lower edge and in turn the lower face of the newspaper 90 contacting and sliding along the lower wall 604 of the lower newspaper-receiving support slot 602. As the newspaper reaches and contacts the base wall 606 of the lower newspaper-receiving support slot 602, it is prevented from falling further down into the lower newspaper-receiving support slot 602 and the flexible nature of the newspaper 90 then causes the topmost portion of the newspaper 90, which extends out of the top opening 607 of the lower newspaper-receiving support slot 602, to fall forward so that the newspaper 90 itself becomes generally arcuate in cross-sectional shape with the middle portion of the newspaper moving closer to the upper wall 608, as shown best in FIG. 24. The top portion of the newspaper 90 is thus quite easy to grasp, and therefore removal of the newspaper 90 through the top opening 607 of the lower newspaper-receiving support slot 602 becomes quite an easy task.

The second embodiment 600 thus is seen to provide several significant improvements for the present invention and over the prior art, improvements which were neither known nor suggested prior to the recent experimentation and development of the second embodiment 600. First, there is no possibility of the newspaper 90 being accidently ripped or damages by contact with the gate 164, as can occur with the initially described embodiment, as the newspaper 90 is no longer in contact with the gate 164. Furthermore, because the lower newspaper-receiving support slot 602 is preferably formed integrally with the pedestal 610 and base stand 612, it is designed to provide an improved structure by which the newspaper 90 can be supported for dispensing thereof, one which permits quick and easy access to the dispensed newspaper 90. Furthermore, as no other newspaper dispensing device found in the prior art drops the newspaper in the manner described above, the lower newspaper-receiving support slot 602 functions in a significantly different manner than any other newspaper vending support structures found in the prior art. It is therefore believed that the lower newspaper-receiving support slot 602 as thus described provides a substantial improvement over the prior art, one not suggested or described in any other patent, whether related or not, and is therefore deserving of independent patent protection. Finally, it is expected that the internal functional characteristics of this embodiment 600 regarding newspaper storage and dispensing will be substantially identical to those described in connection with the first embodiment.

It is to be understood that numerous modifications, substitutions and additions may be made to the newspaper vending machines described herein. For example, the exact dimensions, construction materials and functional characteristics of the features described above may be changed or modified. Additionally, the precise arrangement of the features within the newspaper vending machines described herein may be changed or modified so long as the functionality of the invention is not impaired. Also, the present invention may be used to dispense various types of magazines and other publications, in addition to vending newspapers. It should further be noted that the exact size, shape and angle of the lower newspaper-receiving support slot 602 may be modified or changed so long as the intended functional characteristics are neither degraded nor destroyed. Finally, modification of the size, shape and appearance of the embodiments described herein is expected and will not affect the scope of protection or the specifics of the disclosure contained herein.

There have therefore been shown and described single vend newspaper vending machines which accomplish at least all of their intended purposes.

I claim:

1. An apparatus, comprising:

a vending machine for printed publications including at least one of magazines, periodicals or newspapers, said vending machine comprises a single vend newspaper vending machine including:

a machine housing having outer walls;

a newspaper elevator system mounted in said machine housing, said newspaper elevator system including:

track means mounted in said machine housing;

a fixed position height control member mounted in said machine housing;

a vertically movable height control member mounted in said machine housing;

a newspaper support trolley movably mounted on said track means; and first and second releasable height control member engagement means, said first engagement means operative to engage said fixed position height control member, said second engagement means operative to engage said vertically movable height control member;

said track means, said fixed position height control member, said vertically movable height control member and said newspaper support trolley mounted within said machine housing such that when said newspaper support trolley is movably mounted on said track means, said first releasable height control member engagement means engages said fixed position height control member and said second releasable height control member engagement means engages said vertically movable height control member;

said first releasable height control member engagement means operative to restrict downward movement of said newspaper support trolley when engaging said fixed position height control member, said second releasable height control member engagement means operative to permit downward movement of said vertically movable height control member, upwards movement of said vertically movable height control member causing said newspaper support trolley to be moved upwardly therewith;

newspaper thickness sensing means movably mounted in said machine housing and operative to determine the thickness of the topmost paper;

newspaper pusher means mounted in said machine housing operative to engage a topmost paper on a newspaper stack supported on said newspaper support trolley and slide the topmost newspaper off of the newspaper stack, said newspaper pusher means moving the topmost newspaper to a dispensing position in which at least part of the topmost newspaper is external of said machine housing whereby a customer can access the topmost newspaper and obtain possession thereof;

newspaper pusher and movable height control member actuation means operatively connected to said newspaper pusher means and said movable height control member such that engagement of said actuation means first actuates said newspaper pusher means to remove the topmost paper from the newspaper stack, said actuation means operative to secondly raise said movable height control member a distance determined by the thickness of the topmost paper as determined by said newspaper thickness sensing means, thereby raising said newspaper support trolley such that the penultimate newspaper replaces the vended topmost newspaper in substantially the same position that the topmost newspaper was in prior to being vended;

a storage area for the printed publications;

a dispensing means for selecting and dispensing one of the printed publications and output means for dropping the selected printed publication downwards through and out of said vending machine; and an output chute including;

a lower newspaper-receiving support slot positioned below said output means of said vending machine to receive the printed publication when it is released from said output means, said lower newspaper-receiving support slot including;

a rearwardly angled lower wall;

a base wall extending inwards from the base of said lower wall;

an upper wall extending generally parallel with, positioned above and spaced from said lower wall;

side walls connecting and closing left and right sides of said upper and lower walls thereby forming a generally rectangular box shape of said lower newspaper-receiving support slot;

said lower and upper walls extending at an angle between 10° and 40° from vertical whereby the printed publication will be retained within said lower newspaper-receiving support slot once it has fallen therein from said output means of said vending machine;

said lower wall of said lower newspaper-receiving support slot having a height such that upon the printed publication being dropped therein, a graspable top portion of the printed publication will protrude and extend outwardly from said lower newspaper-receiving support slot whereby the graspable top portion of the printed publication is easily removable and accessible for a user from said lower newspaper-receiving support slot.

2. The apparatus of claim 1 wherein said machine housing further comprises a newspaper release opening positioned above said lower newspaper-receiving support slot such that a printed publication dispensed from said single vend newspaper vending machine falls into said lower newspaper-receiving support slot.

3. The apparatus of claim 1 wherein said output chute is supported in a pedestal positioned below the vending machine for facilitating access thereto by said user.

* * * * *